(12) United States Patent
Ho et al.

(10) Patent No.: US 9,081,138 B2
(45) Date of Patent: Jul. 14, 2015

(54) WAVEGUIDE STRUCTURE

(75) Inventors: Seng-Tiong Ho, Singapore (SG); Qian Wang, Singapore (SG); Yadong Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 261 days.

(21) Appl. No.: 13/476,187

(22) Filed: May 21, 2012

(65) Prior Publication Data

US 2012/0294566 A1 Nov. 22, 2012

Related U.S. Application Data

(60) Provisional application No. 61/488,181, filed on May 20, 2011.

(51) Int. Cl.
| | |
|---|---|
| *G02B 6/12* | (2006.01) |
| *G02B 6/26* | (2006.01) |
| *G02B 6/42* | (2006.01) |
| *G02B 6/10* | (2006.01) |
| *G02B 6/122* | (2006.01) |

(52) U.S. Cl.
CPC .......... *G02B 6/1228* (2013.01); *G02B 6/12004* (2013.01); *G02B 2006/12061* (2013.01); *G02B 2006/12078* (2013.01); *G02B 2006/12121* (2013.01); *G02B 2006/12123* (2013.01)

(58) Field of Classification Search
CPC .... G02B 6/42; G02B 6/1228; G02B 6/12016; G02B 6/0046; G02B 6/0048; G02B 6/2852; G02B 6/29331
USPC .................. 385/1, 2, 14, 43, 50, 129–131, 30
See application file for complete search history.

(56) References Cited

U.S. PATENT DOCUMENTS

| | | | |
|---|---|---|---|
| 7,783,146 B2 | 8/2010 | Blauvelt et al. | |
| 8,213,751 B1* | 7/2012 | Ho et al. | 385/14 |
| 2002/0085602 A1* | 7/2002 | Park et al. | 372/43 |
| 2010/0142579 A1* | 6/2010 | Leem et al. | 372/50.11 |

OTHER PUBLICATIONS

Heck, et al, Hybrid Silicon Photonics for Optical Interconnects, IEEE Journal of Selected Topics in Quantum Electronics, pp. 1-12, Apr. 2010.

* cited by examiner

*Primary Examiner* — Kaveh Kianni
*Assistant Examiner* — Hung Lam
(74) *Attorney, Agent, or Firm* — K. David Crockett, Esq.; Niky Economy Syrengelas, Esq.; Crockett & Crockett, PC

(57) ABSTRACT

According to embodiments of the present invention, a waveguide structure is provided. The waveguide structure includes a silicon-on-insulator layer, and a semiconductor waveguide disposed on the silicon-on-insulator layer, wherein the semiconductor waveguide includes a tapering region.

16 Claims, 22 Drawing Sheets

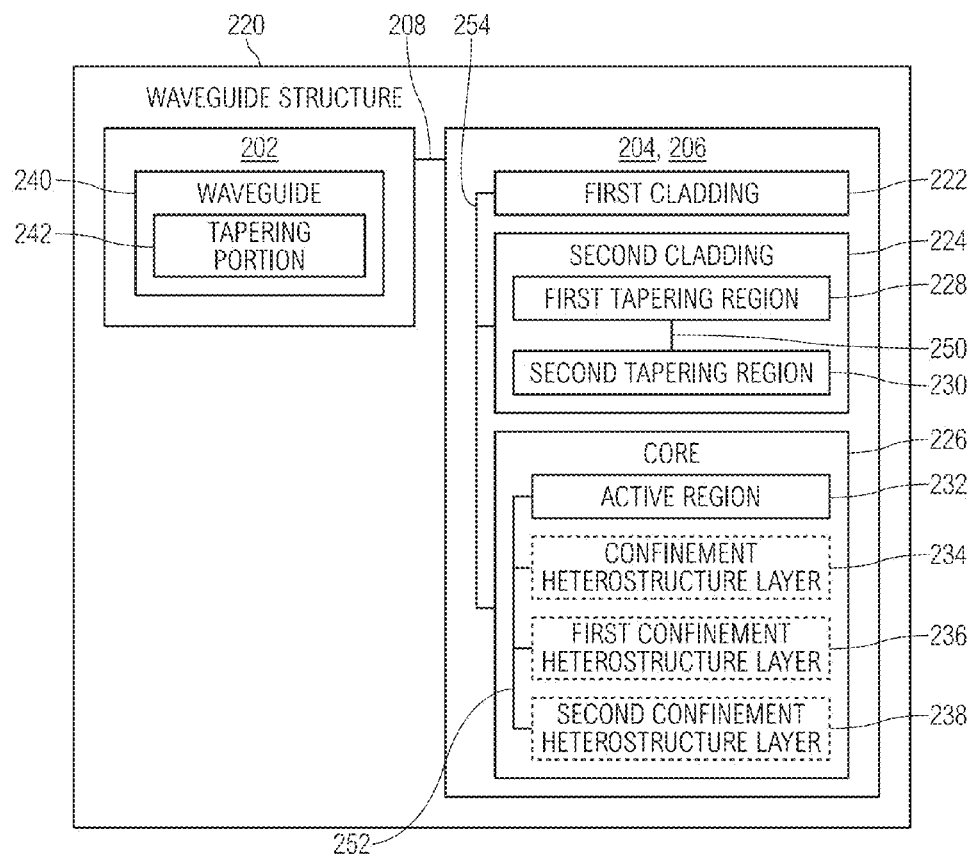
*FIG. 2C*
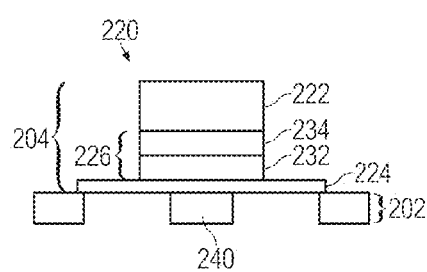
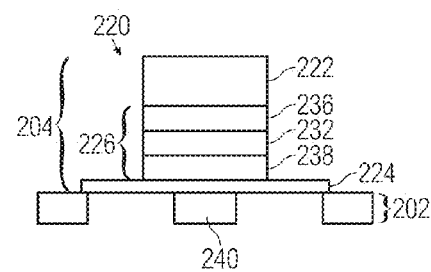
*FIG. 2D*     *FIG. 2E*

US 9,081,138 B2

WAVEGUIDE STRUCTURE

CROSS-REFERENCE TO RELATED APPLICATION

This application claims the benefit of priority of US provisional application No. 61/488,181, filed 20 May 2011, the content of it being hereby incorporated by reference in its entirety for all purposes.

FIELD OF THE INVENTIONS

Various embodiments relate to a waveguide structure.

BACKGROUND OF THE INVENTIONS

Silicon-on-insulator (SOI) is emerging to be a promising platform for dense photonic integration due to the strong light confinement and matured electronics industry. To enable the technology of photonic system on chip, integrating direct band-gap materials/devices on SOI substrate have been investigated and demonstrated recently for light emission, amplification or absorption.

FIGS. 1A and 1B show respectively the cross-sectional view and the side view of a hybrid micro-waveguide structure with III-V bonded on a patterned SOI of the prior art. The hybrid structure 100 includes a SOI micro-waveguide 102 and a III-V direct-band semiconductor 104. The SOI micro-waveguide 102 may include or consist of a patterned silicon core layer 106 with a bottom cladding of silicon dioxide 108. The direct-band semiconductor 104 on the top of the SOI micro-waveguide 102 may include or consist of an n-contact layer 110, a core region 112 and a top p-cladding 114.

The direct-band semiconductor 104 is bonded on the SOI micro-waveguide 102. Appropriate width and height of the silicon waveguide (e.g. of the silicon core 106) are chosen so that the hybrid micro-photonic waveguide structure 100 confines the light in the silicon waveguide in the central region (as schematically shown in FIG. 1A in the shaded circle 120) but amplifies/absorbs through the evanescent field confined in the bonded III-V semiconductor material 104. FIG. 1B illustrates the confinement of light, as represented by 122, in the SOI micro-waveguide 102 and the propagation of the light 122 through the silicon core 106 of the SOI micro-waveguide 102. In addition, FIG. 1B illustrates that the evanescent field of the light 122, as illustrated in the dotted circle 124, extends to the direct-band semiconductor 104, to be absorbed by the core region 112.

In other conventional structures, the direct-band semiconductor is bonded on a low-refractive index material (e.g. Benzocyclobutene, BCB) and the light is coupled to the waveguide (e.g. polymer waveguide) fabricated surrounding the SOI waveguide through butt-coupling.

These configurations have some shortcomings in terms of silicon nanophotonic integration applications, such as efficiency, size, thermal management, and fabrication complexity, etc.

SUMMARY

According to an embodiment, a waveguide structure is provided. The waveguide structure may include a silicon-on-insulator layer, and a semiconductor waveguide disposed on the silicon-on-insulator layer, wherein the semiconductor waveguide includes a tapering region.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2A shows a schematic block diagram of a waveguide structure, while

FIG. 2C shows a schematic block diagram of a waveguide structure, while FIGS. 2D and 2E show simplified cross-sectional representations of the waveguide structure of the embodiment of FIG. 2C, according to various embodiments.

FIG. 3 shows a waveguide structure with a top-confined integration, according to various embodiments.

FIG. 7A shows a schematic of a two-dimensional model in the y-z plane, while

FIG. 8B shows a tapering waveguide structure optimized with the two-dimensional approximate model using $\alpha\_Si=0.7$ and $\alpha\_35=1.4$, while

FIG. 9 shows a waveguide structure with a top-confined integration, according to various embodiments.

FIG. 13B shows a tapering waveguide structure optimized with the two-dimensional approximate model using $\alpha\_35=1.0$, while

FIG. 14 shows a waveguide structure with a bottom-confined integration, according to various embodiments.

FIG. 18B shows a tapering waveguide structure optimized with the two-dimensional approximate model using $\alpha\_Si=0.8$ and $\alpha\_35=1.4$, while

DETAILED DESCRIPTION OF THE INVENTIONS

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the devices or structures may be analogously valid for the other device or structure.

In the context of various embodiments, the phrase "at least substantially" may include "exactly" and a variance of +/−5% thereof. As an example and not limitations, "A is at least substantially same as B" may encompass embodiments where A is exactly the same as B, or where A may be within a variance of +/−5%, for example of a value, of B, or vice versa.

In the context of various embodiments, the term "about" or "approximately" as applied to a numeric value encompasses the exact value and a variance of +/−5% of the value.

As used herein, the term "and/or" includes any and all combinations of one or more of the associated listed items.

Various embodiments relate to the area of photonic integration, e.g. the photonic integration of direct band-gap semiconductor on silicon for light amplification or absorption, and the vertical access interconnection of light between the direct band-gap semiconductor layer and the silicon layer.

Various embodiments may provide a waveguide structure. Various embodiments may provide integrated structures of a direct band-gap semiconductor on silicon-on-insulator (SOI) layer or substrate, for example for light amplification/absorption. The integrated structures of various embodiments also provide optical vertical interconnection access of light between the SOI layer and the direct band-gap semiconductor layer through top-down coupling. Integration of the direct band-gap semiconductor on SOI may be realized through direct wafer bonding as an example, which has less fabrication steps and better thermal management, as compared to, for example, Benzocyclobutene (BCB) bonding.

Figure 2A:
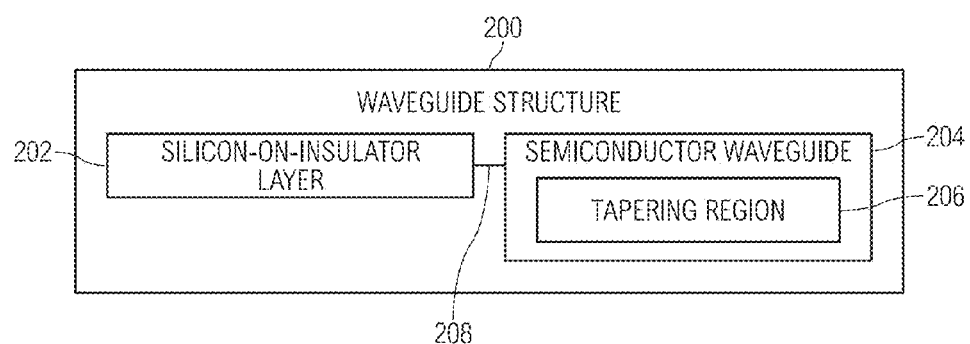
Figure 2B:
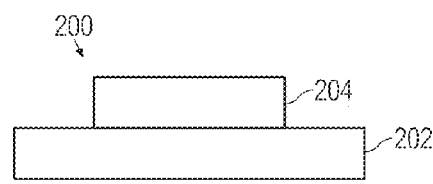
FIG. 2B shows a simplified cross-sectional representation of the waveguide structure of the embodiment of FIG. 2A, according to various embodiments.

FIG. 2A shows a schematic block diagram of a waveguide structure 200, while FIG. 2B shows a simplified cross-sectional representation of the waveguide structure 200 of the embodiment of FIG. 2A, according to various embodiments. The waveguide structure 200 includes a silicon-on-insulator (SOI) layer 202, and a semiconductor waveguide 204 disposed on the silicon-on-insulator layer 202, wherein the semiconductor waveguide 204 includes a tapering region 206. In FIG. 2A, the line represented as 208 is illustrated to show the relationship between the silicon-on-insulator layer 202 and the semiconductor waveguide 204, which may include optical coupling and/or mechanical coupling.

In the context of various embodiments, a tapering region may mean a region having a width that changes, e.g. increases, for example in the direction of light propagation or along a longitudinal direction/axis of the semiconductor waveguide 204. In various embodiments, the tapering region 206 may have a tapering degree or angle in a range of between about 0.5° and about 70° relative to the longitudinal axis/direction of the semiconductor waveguide 204, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

In the context of various embodiments, the length of the tapering region 206 may be in a range of between about 10 μm and about 100 μm, e.g. a range of between about 10 μm and about 80 μm, a range of between about 10 μm and about 50 μm, a range of between about 10 μm and about 30 μm, a range of between about 30 μm and about 100 μm or a range of between about 50 μm and about 100 μm.

In the context of various embodiments, the width of the tapering region 206 at its widest portion may be in a range of between about 1 μm and about 4 μm, e.g. between about 1 μm and about 2 μm, between about 1 μm and about 1.5 μm, between about 2 μm and about 4 μm or between about 2 μm and about 3 μm.

In the context of various embodiments, the portion of the semiconductor waveguide 204 adjoining the tapering region 206 may have a uniform width, for example having a width between about 0.5 μm and about 5 μm (5000 nm), e.g. between about 0.5 μm and about 3 μm, between about 0.5 μm and about 1 μm, between about 1 μm and about 3 μm, between about 2 μm and about 4 μm or between about 2 μm and about 3 μm.

FIG. 2C shows a schematic block diagram of a waveguide structure 220, while FIGS. 2D and 2E show simplified cross-sectional representations of the waveguide structure 220 of the embodiment of FIG. 2C, according to various embodiments. The waveguide structure 220 includes a silicon-on-insulator layer 202 and a semiconductor waveguide 204 including a tapering region 206, which may be similar to the embodiment as described in the context of FIG. 2A.

The semiconductor waveguide 204 further includes a first cladding 222 including a first conductivity type material, a second cladding 224 including a second conductivity type material, and a core 226 disposed in between the first cladding 222 and the second cladding 224, and wherein each of the core 226 and the first cladding 222 includes the tapering region 206, wherein the respective tapering regions of each of the core 226 and the first cladding 222 is configured to at least substantially overlap with each other, and wherein the second cladding 224 is disposed between the core 226 and the silicon-on-insulator layer 202. For example, the tapering region of the core 226 may partially overlap or completely overlap with the tapering region of the first cladding 222, for example overlapping in a range of between about 30% and about 100%, e.g. a range of about 50% and about 100% or range of about 75% and about 100%.

The second cladding 224 may include a first tapering region 228 configured to at least substantially overlap with the respective tapering regions of each of the core 226 and the first cladding 222 (e.g. overlapping in a range of between about 30% and about 100%, e.g. a range of about 50% and about 100% or range of about 75% and about 100%), and a second tapering region 230 following the first tapering region 228 (e.g. the first tapering region 228 and the second tapering region 230 are adjacent to each other, e.g. a sequential arrangement of the first tapering region 228, followed by the second tapering region 230), wherein the second tapering region 230 has a width that is wider than a width of the first tapering region 228, and wherein the first tapering region 228 and the second tapering region 230 are configured to taper in a direction at least substantially same as the respective tapering regions of each of the core 226 and the first cladding 222 along a longitudinal direction of the semiconductor waveguide 204. In FIG. 2C, the line represented as 250 is illustrated to show the relationship between the first tapering region 228 and the second tapering region 230, which may include optical coupling and/or mechanical coupling.

In various embodiments, the first tapering region 228 may have a tapering degree or angle in a range of between about 0.5° and about 70° relative to the longitudinal axis/direction of the semiconductor waveguide 204, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°. The second tapering region 230 may have a tapering degree or angle in a range of between about 0.5° and about 80° relative to the longitudinal axis/direction of the semiconductor waveguide 204, e.g. a range of between about 0.5° and about 50°, a range of between about 0.5° and about 30°, a range of between about 0.5° and about 10°, a range of between about 5° and about 80°, a range of between about 5° and about 30°, a range of between about 20° and about 80° or a range of between about 40° and about 80°.

In various embodiments, the core 226 includes an active region 232 configured for waveguiding, and a separate confinement heterostructure layer 234 arranged above or under the active region 232. In further embodiments, the core 226 includes an active region 232 configured for waveguiding, and two separate confinement heterostructure layers (e.g. a first confinement heterostructure layer 236 and a second confinement heterostructure layer 238), wherein the active region 232 is arranged in between the two separate confinement heterostructure layers (i.e. between the first confinement heterostructure layer 236 and the second confinement heterostructure layer 238). In FIG. 2C, the line represented as 252 is illustrated to show the relationship between the active region 232 and the separate confinement heterostructure layer 234, and the active region 232 and the two separate confinement heterostructure layers (e.g. a first confinement heterostructure layer 236 and a second confinement heterostructure layer 238), which may include optical coupling and/or mechanical coupling.

In the context of various embodiments, a confinement heterostructure layer (e.g. 234, 236, 238) may mean a layer of material, for example disposed over an active region, so as to confine the light in the active region 232. The confinement heterostructure layer (e.g. 234, 236, 238) has a lower refractive index than that of the active region 232. The confinement heterostructure layer (e.g. 234, 236, 238) may include any semiconductor material that has a shorter bandgap wavelength compared to the material of the active region 232. In the context of various embodiments, examples of materials for the active region 232 and the confinement heterostructure layer (e.g. 234, 236, 238) may include a ternary semiconductor including but not limited to gallium indium arsenide ($GaIn_xAs$), or a quaternary semiconductor including but not limited to aluminium gallium indium arsenide (AlGaInAs) or indium gallium arsenide phosphide (InGaAsP).

In various embodiments, the silicon-on-insulator (SOI) layer 202 includes a waveguide (SOI waveguide) 240 configured to at least substantially overlap with the semiconductor waveguide 204 (e.g. overlapping in a range of between about 30% and about 100%, e.g. a range of about 50% and about 100% or range of about 75% and about 100%). The waveguide 240 may include a tapering portion 242 configured to at least substantially overlap with the tapering region 206 (e.g. overlapping in a range of between about 30% and about 100%, e.g. a range of about 50% and about 100% or range of about 75% and about 100%), and wherein the tapering portion 242 is configured to taper in a direction at least substantially same as the tapering region 206 along a longitudinal direction of the semiconductor waveguide 204. In various embodiments, the tapering portion 242 may have a tapering degree or angle in a range of between about 0.5° and about 70° relative to the longitudinal axis/direction of the semiconductor waveguide 204, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

In FIG. 2C, the line represented as 254 is illustrated to show the relationship between the first cladding 222, the second cladding 224 and the core 226, which may include optical coupling and/or mechanical coupling.

In the context of various embodiments, the term "overlap" with regard to, for example two features, may include an overlapping range of about 30% and about 100% for a feature relative to the other feature, e.g. a range of about 50% and about 100% or range of about 75% and about 100%.

In the context of various embodiments, the tapering region 206 may be configured to act or function as vertical light access between the silicon-on-insulator layer 202 and the semiconductor waveguide 204, for top-down coupling of the light.

In the context of various embodiments, the light confinement factor in the active region 232 (for example in a region outside the tapering region 206) may be around 20% or more (i.e. a 20%), while the light confinement factor in the silicon-on-insulator (SOI) layer 202 may be around 20% or less (i.e. ≤20%).

In the context of various embodiments, the semiconductor waveguide 204 includes or is a direct band-gap semiconductor. A direct band-gap semiconductor is a semiconductor where the momentum of electrons and holes is the same in both the conduction band and the valence band. This means that the maximum (peak) of the valence band may be aligned with the minimum of the conduction band at a substantially similar momentum, such that an electron can directly emit a photon. In various embodiments, the direct band-gap semiconductor may be a III-V semiconductor (e.g. indium phosphide (InP), gallium antimonide (GaSb), gallium arsenide (GaAs), gallium nitride (GaN)), a II-VI semiconductor (e.g. zinc selenide (ZnSe), zinc sulfide (ZnS)) or a IV-VI semiconductor (e.g. lead selenide (PbSe)). In various embodiments, the direct band-gap semiconductor may include a ternary semiconductor including but not limited to gallium indium arsenide ($GaIn_xAs$), or a quaternary semiconductor including but not limited to aluminium gallium indium arsenide (AlGaInAs) or indium gallium arsenide phosphide (InGaAsP).

In the context of various embodiments, the first cladding 222 may be a p-cladding including indium phosphide (InP) doped with zinc (Zn) while the second cladding 224 may be an n-cladding including indium phosphide (InP) doped with silicon (Si). In the context of various embodiments, the core 226 may include aluminium gallium indium arsenide (AlGaInAs) or indium gallium arsenide phosphide (InGaAsP).

In the context of various embodiments, the semiconductor waveguide 204 may have a width of between about 0.5 µm and about 5 µm (5000 nm), e.g. between about 0.5 µm and about 3 µm, between about 0.5 µm and about 1 µm, between about 1 µm and about 3 µm, between about 2 µm and about 4 µm or between about 2 µm and about 3 µm.

In the context of various embodiments, the core 226 may have a width of between about 0.5 µm and about 1.5 µm, e.g. between about 1.0 µm and about 1.5 µm or between about 0.5 µm and about 1.0 µm, e.g. a width of about 0.5 µm, about 0.8 µm, about 1.0 µm, about 1.2 µm or about 1.5 µm.

In the context of various embodiments, the core 226 may have a thickness of between about 200 nm and about 500 nm, e.g. between about 200 nm and about 300 nm, between about 350 nm and about 500 nm or between about 250 nm and about 400 nm.

In the context of various embodiments, the active region 232 may have a thickness of between about 50 nm and about 300 nm, e.g. between about 50 nm and about 200 nm, between about 50 nm and about 100 nm or between about 150 nm and about 300 nm.

In the context of various embodiments, each of the confinement heterostructure layer 234, the first confinement heterostructure layer 236 and the second confinement heterostructure layer 238 may have a thickness of between about 50 nm and about 300 nm, e.g. between about 50 nm and about 200 nm, between about 50 nm and about 100 nm or between about 150 nm and about 300 nm.

In the context of various embodiments, the silicon-on-insulator layer 202 may have a thickness of between about 200 nm and about 400 nm, e.g. between about 200 nm and about 300 nm or between about 300 nm and about 400 nm, e.g. a thickness of about 200 nm, about 250 nm, about 300 nm, about 350 nm or about 400 nm.

In the context of various embodiments, the waveguide 240 may have a thickness of between about 200 nm and about 400 nm, e.g. between about 200 nm and about 300 nm or between about 300 nm and about 400 nm, e.g. a thickness of about 200 nm, about 250 nm, about 300 nm, about 350 nm or about 400 nm.

In the context of various embodiments, the waveguide 240 may have a width of between about 400 nm and about 4 µm (4000 nm), e.g. between about 400 nm and about 2000 nm, between about 400 nm and about 1000 nm, between about 1000 nm and about 4000 nm or between about 1000 nm and about 2000 nm.

In the context of various embodiments, the first conductivity type is a p-type conductivity type, and the second conductivity type is an n-type conductivity type.

In various embodiments, a material having p-type conductivity type means that the material is p-doped. The term "p-doped" may mean a host material (generally a semiconductor) that is doped with dopant atoms that may accept weakly-bound outer electrons from the host material, thereby creating vacancies left behind by the electrons, known as holes. This results in an electrically conductive p-type semiconductor with an excess number of mobile holes (positively charged carriers). Such dopants are also generally referred to as acceptors.

In various embodiments, a material having n-type conductivity type means that the material is n-doped. The term "n-doped" may mean a host material (generally a semiconductor) that is doped with dopant atoms that may provide extra conduction electrons to the host material, thereby resulting in an electrically conductive n-type semiconductor with an excess number of mobile electrons (negatively charged carriers). Such dopants are also generally referred to as donors.

Various embodiments may provide a number of types of waveguide structures with integration of a direct band-gap semiconductor on a silicon-on-insulator (SOI) substrate or layer, and also optical vertical interconnection access between the direct band-gap layer of the semiconductor and the SOI layer. The direct band-gap semiconductor may include a waveguide or implemented as a waveguide or configured to function as a waveguide. The direct band-gap semiconductor or correspondingly the semiconductor waveguide may be integrated on top of the SOI layer. In other words, the direct band-gap semiconductor is arranged over the SOI layer.

In various embodiments, the light provided to the SOI layer or a waveguide in the SOI layer may propagate through the SOI layer and subsequently coupled to the direct band-gap semiconductor via a top-down coupling approach. As a result, the light propagating through the waveguide structures may be confined in the direct band-gap semiconductor layer for amplification/absorption, thereby improving the efficiency of the waveguide structure or device as compared to the evanescent field device of the prior art illustrated in FIGS. 1A and 1B.

In various embodiments, a top-down coupling may be realized through a tapering transition, which transfers or couples the light between the SOI layer and the direct-band semiconductor layer.

FIG. 3 shows a waveguide structure with a top-confined integration, with a tapering region, according to various embodiments. FIG. 3A shows a cross-sectional view of the waveguide structure 300, FIG. 3B shows a side view of the waveguide structure 300, FIG. 3C shows the top view of the waveguide structure 300, and FIG. 3D shows the top view of the waveguide structure 360.

The waveguide structure 300 includes a silicon-on-insulator (SOI) substrate 302 and a semiconductor (e.g. II-VI direct-band semiconductor, III-V direct-band semiconductor, IV-VI direct-band semiconductor, ternary semiconductor or quaternary semiconductor) waveguide 304. The waveguide structure 300 may be an integrated structure, and the semiconductor waveguide 304 may be bonded to the SOI substrate 302, for example through direct wafer bonding.

Figure 3A:
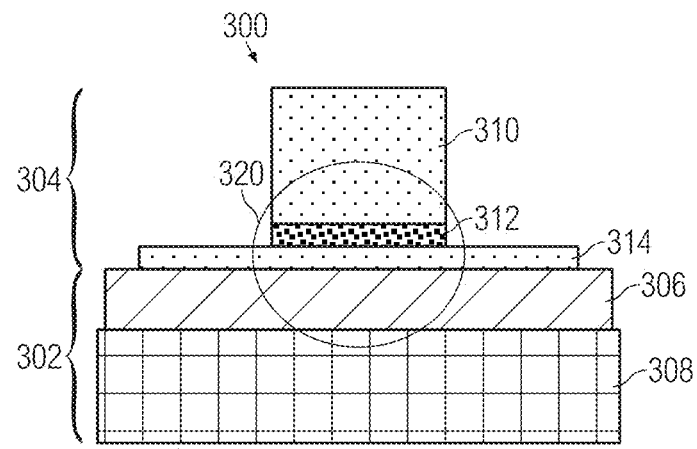
FIG. 3A shows a cross-sectional view of the waveguide structure.

The SOI substrate 302 includes a silicon-on-insulator (SOI) layer or core layer 306 with a bottom cladding of silicon dioxide 308. The semiconductor waveguide 304 is integrated on top of or on or over the SOI layer 306 and correspondingly also the SOI substrate 302. The semiconductor waveguide 304 includes a p-cladding (e.g. a first cladding having a first conductivity type material) 310, a core 312 and an n-cladding (e.g. a second cladding having a second conductivity type material) 314. As illustrated in FIG. 3A, the semiconductor waveguide 304 is etched such that the p-cladding 310 and the core 312 may be disposed on a substantially central position of the waveguide structure 300, and have a respective width that is less than the width of the n-cladding 314. The p-cladding 310 and the core 312 may have at least substantially same width. The n-cladding 314 may have a width that is less than the width of the silicon core layer 306. In various embodiments, lateral light confinement (for example as schematically shown in FIG. 3A in the shaded circle 320) is achieved based on the etched semiconductor waveguide 304. As an example and not limitation, the semiconductor waveguide 304 may be a III-V direct-band semiconductor, for example indium phosphide (InP). The p-cladding 310 may be indium phosphide (InP) doped with zinc (Zn), the n-cladding 314 may be indium phosphide (InP) doped with silicon (Si), while the core 312 may be aluminium gallium indium arsenide (AlGaInAs) or indium gallium arsenide phosphide (InGaAsP).

Figure 1A:
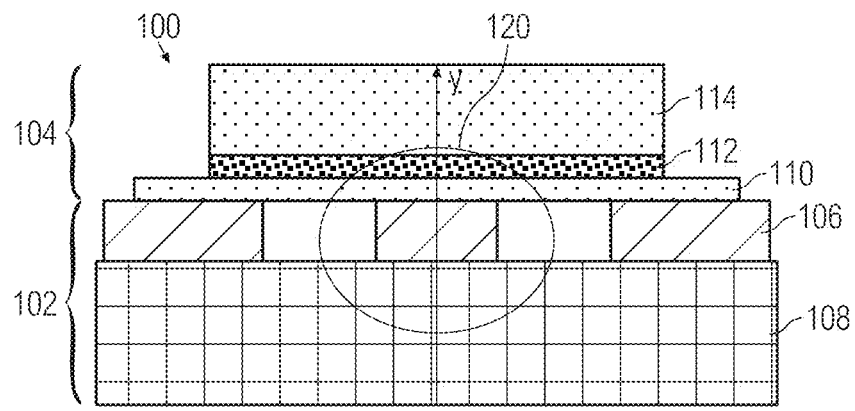
FIGS. 1A and 1B show respectively the cross-sectional view and the side view of a hybrid micro-waveguide structure with III-V bonded on a patterned SOI of the prior art.
Figure 1B:
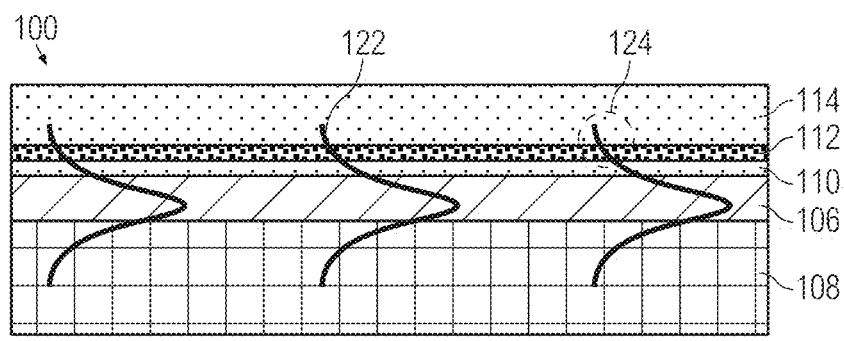

Through appropriate design or implementation of the width of the semiconductor waveguide 304, light may be confined in the semiconductor waveguide 304, compared to that of the structure 100 of FIGS. 1A and 1B, thereby improving the efficiency of the waveguide structure or device 300 in terms of light amplification. In various embodiments, the semiconductor waveguide 304 may have a width of between about 0.5 μm and about 5 μm (5000 nm), e.g. between about 0.5 μm and about 3 μm, between about 0.5 μm and about 1 μm, between about 1 μm and about 3 μm, between about 2 μm and about 4 μm or between about 2 μm and about 3 μm.

Figure 3B:
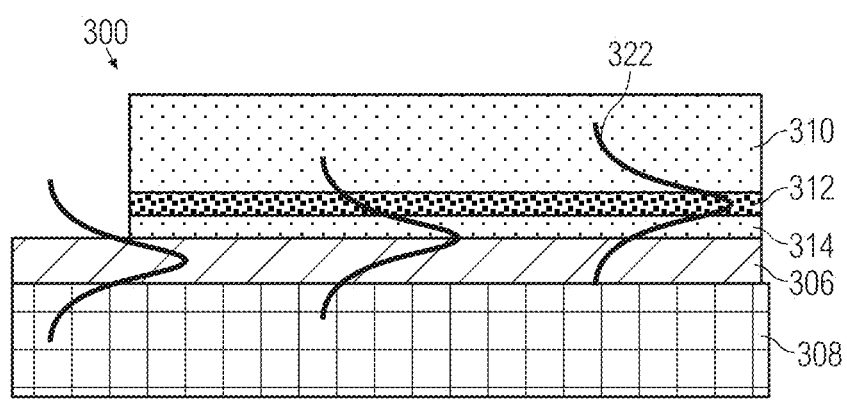
FIG. 3B shows a side view of the waveguide structure.

FIG. 3B illustrates the confinement of light, as represented by 322, in the SOI layer 306 and the propagation of the light 322 through the SOI layer 306. As the light 322 propagates through the SOI layer 306, the light 322 may be transferred or coupled from the SOI layer 306 to the semiconductor waveguide 304, via top-down coupling, through a tapering transition.

Figure 3C:
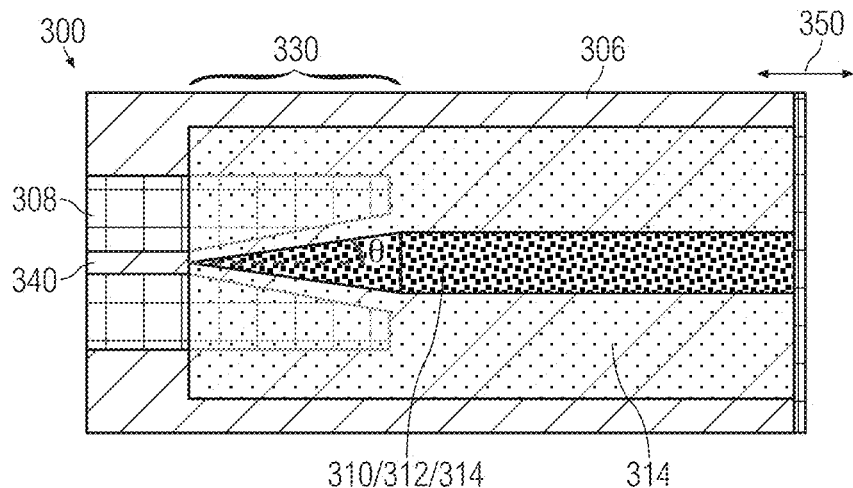
FIGS. 3C and 3D show the top view of the waveguide structure.

FIG. 3C shows a top view of the waveguide structure 300, including a tapering region 330 for top-down coupling between the SOI layer 306 and the semiconductor waveguide 304. Each of the p-cladding 310 and the core 312 may be formed with the tapering region 330. In other words, each of the p-cladding 310 and the core 312 may have a portion with a tapering region 330, followed by a portion of uniform width. The respective tapering regions of each of the p-cladding 310 and the core 312 at least substantially overlap with each other (e.g. overlapping in a range of between about 30% and about 100%, e.g. a range of about 50% and about 100% or range of about 75% and about 100%). In various embodiments, the tapering region 330 may have a tapering degree, θ, in a range of between about 0.5° and about 70° relative to the longitudinal axis, as represented by the double-headed arrow 350, of the semiconductor waveguide 304, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

The SOI layer 306 may include a waveguide 340 configured to at least substantially overlap with the semiconductor waveguide 304. While not clearly shown in FIG. 3C, the waveguide 340 may be formed with a tapering portion that at least substantially overlaps with the tapering region 330. The tapering portion tapers in a direction at least substantially same as the tapering region 330 along the longitudinal direction/axis 350 of the semiconductor waveguide 304. The waveguide 340 is joined with the SOI layer 306, after the tapering region 330. The waveguide 340 may partially overlap or completely overlap with the semiconductor waveguide 304, for example overlapping in a range of between about 30% and about 100%, e.g. a range of about 50% and about 100% or range of about 75% and about 100%. The tapering portion may partially overlap or completely overlap with the tapering region 330, for example overlapping in a range of between about 30% and about 100%, e.g. a range of about 50% and about 100% or range of about 75% and about 100%. In various embodiments, the tapering portion may have a tapering degree in a range of between about 0.5° and about 70° relative to the longitudinal axis 350 of the semiconductor waveguide 304, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

Figure 3D:
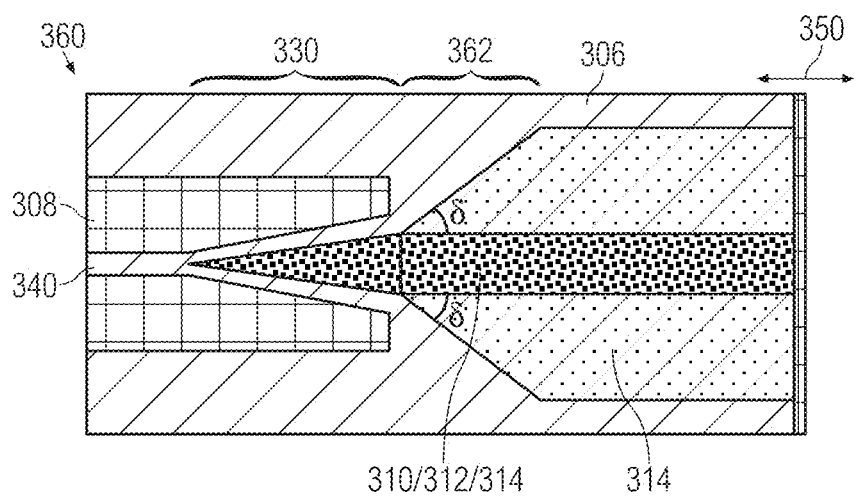

FIG. 3D shows a top view of the waveguide structure 360. The waveguide structure 360 is similar to the waveguide structure 300, except that the n-cladding 314 is etched so as to be tapered, for minimizing reflection loss that may occur at the end of the tapering region 330. The n-cladding 314 includes a first tapering region that at least substantially overlaps (e.g. overlapping in a range of between about 30% and about 100%, e.g. a range of about 50% and about 100% or range of about 75% and about 100%) with the tapering region 330 and the respective tapering regions of each of the p-cladding 310 and the core 312, and a second tapering region 362 following the first tapering region. As illustrated in FIG. 3D, the second tapering region 362 has a width that is wider than a width of the first tapering region. The n-cladding 314 may have a uniform width after the second tapering region 362.

The first tapering region and the second tapering region 362 taper in a direction at least substantially same as the respective tapering regions of each of the p-cladding 310 and the core 312 along a longitudinal direction/axis, as illustrated by the double-headed arrow 350, of the semiconductor waveguide 304. In various embodiments, the first tapering region may have a tapering degree in a range of between about 0.5° and about 70° relative to the longitudinal axis 350 of the semiconductor waveguide 304, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°. The second tapering region 362 may have a tapering degree, δ, in a range of between about 0.5° and about 80° relative to the longitudinal axis 350 of the semiconductor waveguide 304, e.g. a range of between about 0.5° and about 50°, a range of between about 0.5° and about 30°, a range of between about 0.5° and about 10°, a range of between about 5° and about 80°, a range of between about 5° and about 30°, a range of between about 20° and about 80° or a range of between about 40° and about 80°.

The SOI layer 306 is thinner compared to the layer 106 of the structure 100 of FIGS. 1A and 1B. The SOI layer 306 may have a thickness of between about 200 nm and about 400 nm, e.g. between about 200 nm and about 300 nm or between about 300 nm and about 400 nm, e.g. a thickness of about 200 nm, about 250 nm, about 300 nm, about 350 nm or about 400 nm.

The waveguide structures 300, 360, confine the light laterally based on the etched direct band-gap semiconductor waveguide 304 on top of the SOI layer 306. In various embodiments, the light confinement in an active region of the core 312 may be maximized or enhanced for amplification/absorption through adjusting the width of the semiconductor waveguide 304 on the SOI layer 306.

Figure 4:
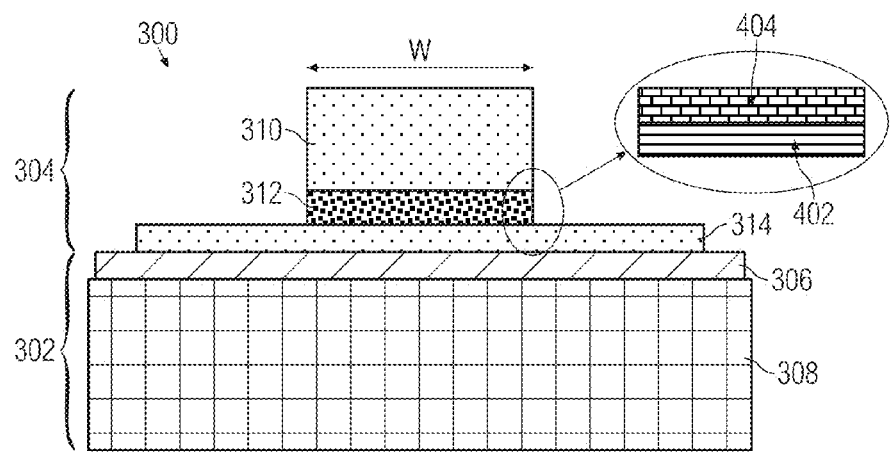
FIG. 4 shows a cross-sectional view of the waveguide structure of the embodiments of FIG. 3.

FIG. 4 shows a cross-sectional view of the waveguide structure 300 of the embodiments of FIG. 3. Each of the p-cladding 310 and the core 312 may have a respective width, W. The core 312 includes an active region 402 and a separate confinement heterostructure (SCH) layer 404 arranged over the active region 402. The active region 402 may have a thickness of about 150 nm and the separate confinement heterostructure (SCH) layer 404 may have a thickness of about 200 nm. However, it should be appreciated that the active region 402 and the SCH layer 404 may have other thicknesses. In further embodiments, the core 312 may include an active region and two separate confinement heterostructure layers sandwiching the active region (i.e. the active region is arranged in between the two separate confinement heterostructure layers).

The SOI layer 306 may have a thickness of about 300 nm with a 1 μm buried oxide layer 308 underneath. However, it should be appreciated that the SOI layer 306 and the oxide layer 308 may have other thicknesses. The direct band-gap semiconductor may be an indium phosphide (InP) (III-V semiconductor) wafer, suitable for the photonic integrated circuits working at a wavelength of 1550 nm telecommunication window. In other words, the semiconductor waveguide 304 may be an indium phosphide (InP) semiconductor waveguide.

The refractive indices for the SOI layer 306, the active region 402, the SCH layer 404 and the InP cladding layers 310, 314 are about 3.477, 3.524, 3.461 and 3.167, respectively. The thickness of the bottom InP cladding layer 314 is about 150 nm.

Based on a one-dimensional slab waveguide analysis, the waveguide structure 300 allows a confinement of approximately 30% in the active region 402.

A full-vectorial modal analysis may be carried out, which takes account of the influence of the width, W, of the semiconductor waveguide 304 on the light confinement.

The confinement factor in the active region 402 may be given by $$\Gamma_a = \frac{\iint_{A_a} |E_x|^2 dx dy}{\iint_{A_\infty} |E_x|^2 dx dy}, \quad \text{(Equation 1)}$$

where $A_a$ is the active region area, $A_\infty$ is the whole simulation region and $E_x$ is the electric field of a mode.

The confinement factor in the SOI layer 306 may be given by $$\Gamma_{SOI} = \frac{\iint_{A_{SOI}} |E_x|^2 dx dy}{\iint_{A_\infty} |E_x|^2 dx dy}, \quad \text{(Equation 2)}$$

where $A_{SOI}$ is the SOI layer area, $A_\infty$ is the whole simulation region.

Figure 5:
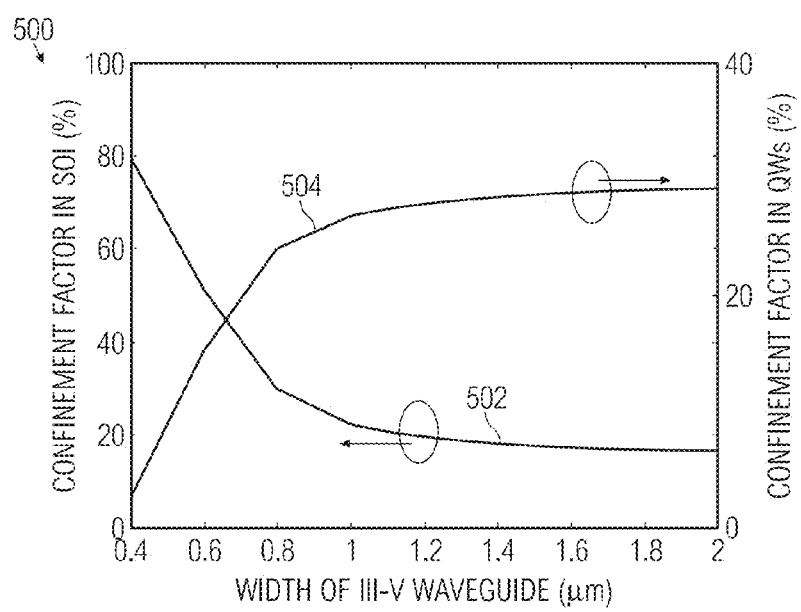
FIG. 5 shows a plot of confinement factors in the active region and the SOI layer for different waveguide widths of the waveguide structure of the embodiment of FIG. 4.

FIG. 5 shows a plot 500 of confinement factors in the active region 402 and the SOI layer 306 for different waveguide widths, W. The plot 500 shows that the confinement factor 502 in the SOI layer 306 decreases with the waveguide width, while the confinement factor 504 in the active region 402 increases with the waveguide width.

Figure 6A:
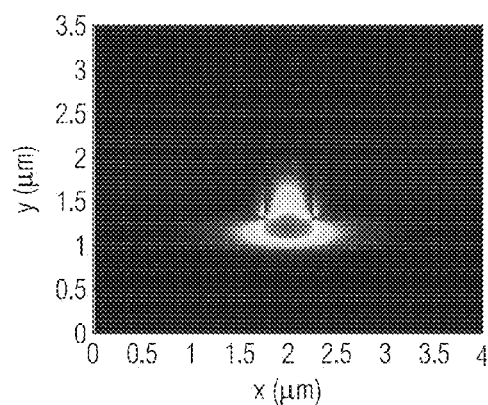
FIGS. 6A to 6D show the modal profiles for different waveguide widths of the waveguide structure of the embodiment of FIG. 4.
Figure 6B:
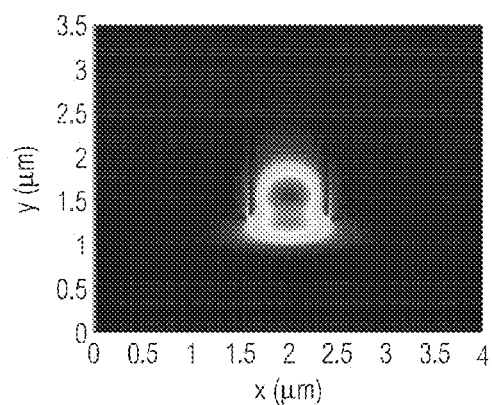
Figure 6C:
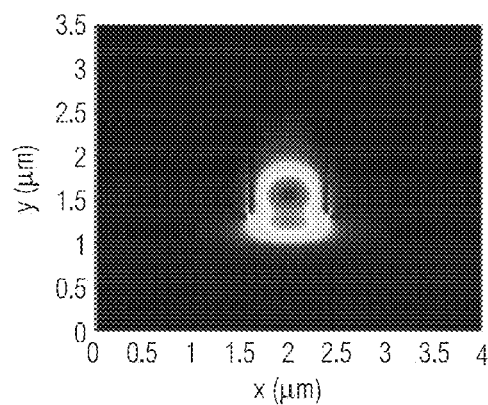
Figure 6D:
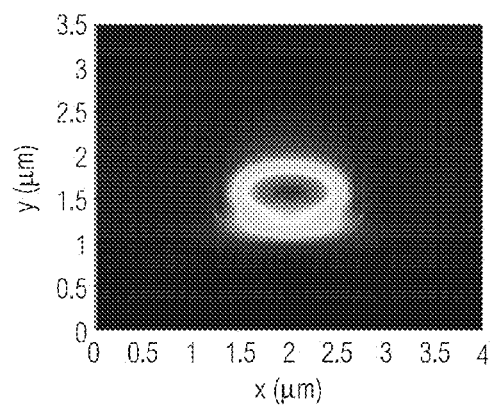

FIGS. 6A to 6D show the modal profiles for different waveguide widths, W, of the waveguide structure 300 of the embodiment of FIG. 4. FIG. 6A shows the modal profile for a waveguide width, W=0.5 μm, FIG. 6B shows the modal profile for a waveguide width, W=0.8 μm, FIG. 6C shows the modal profile for a waveguide width, W=1.2 μm, and FIG. 6D shows the modal profile for a waveguide width, W=1.5 μm, with corresponding confinement factors, in the active region, of about 3.9%, 23.4%, 28.3% and 29.2% respectively. As can be seen from FIGS. 6A to 6D, the light mode moves or transfers from the SOI layer to the semiconductor waveguide as the waveguide width, W, increases.

Figure 7A:
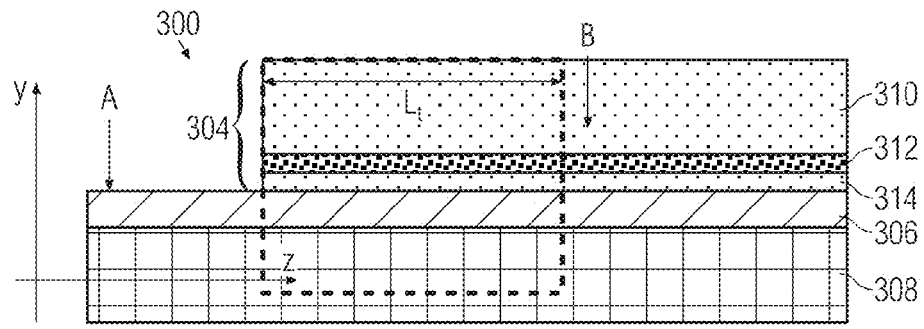
Figure 7B:
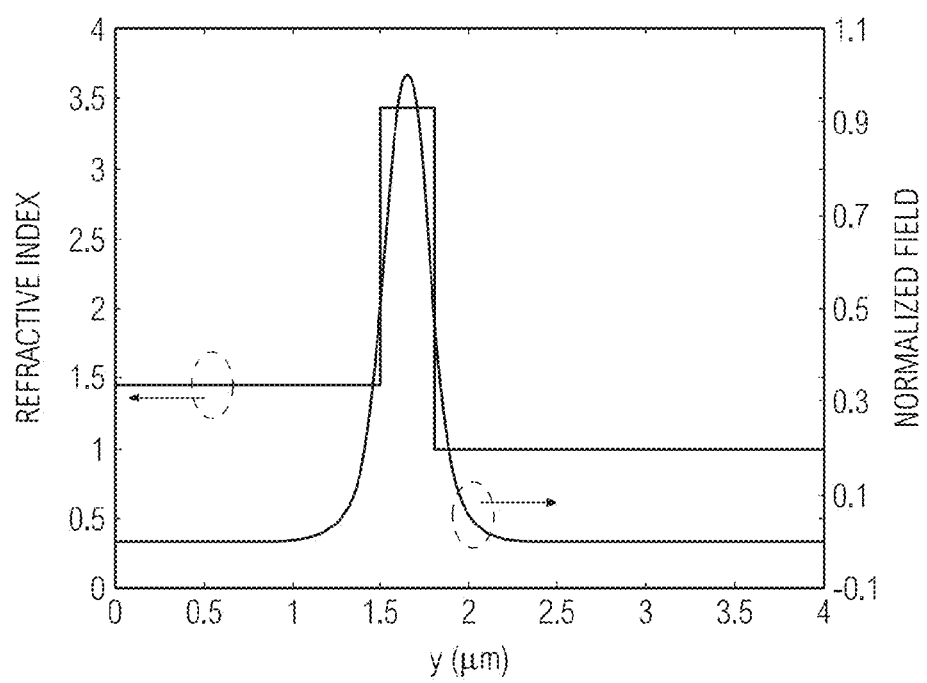
FIGS. 7B and 7C show plots of the refractive index profile and the modal profile at positions 'A' and 'B' of the two-dimensional model of FIG. 7A.
Figure 7C:
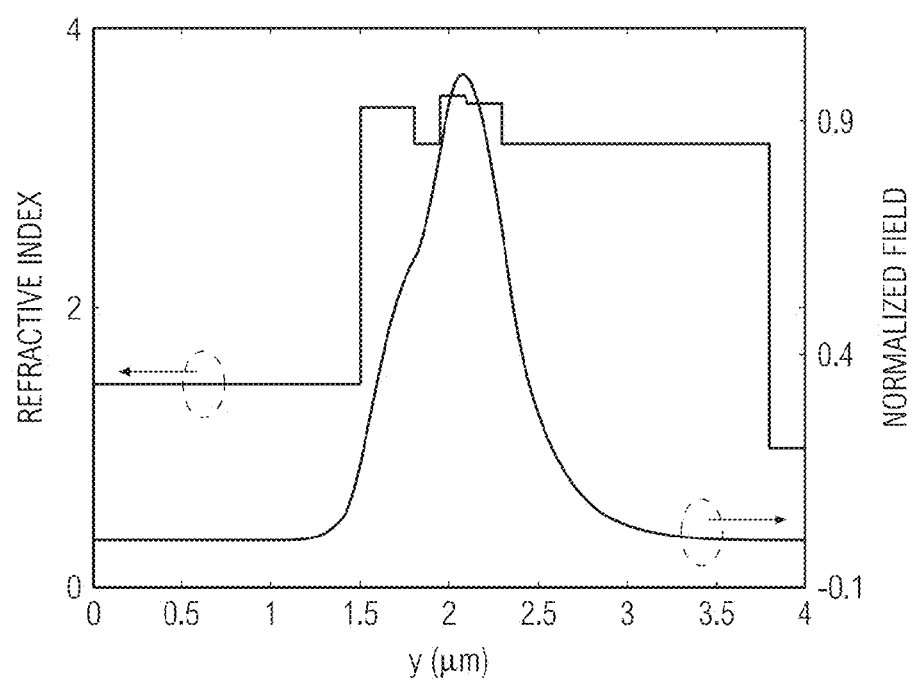

Top-down coupling may be realized with a lateral tapering transition and the taper shape may be optimized for maximal coupling efficiency. An approximated two-dimensional (2D) model in the y-z plane may be employed, as illustrated in FIG. 7A, after using the effective index method (EIM) along the x-direction (direction pointing into the page). FIGS. 7B and 7C show plots of the refractive index profile and the modal profile at positions 'A' and 'B' respectively, of the two-dimensional model of FIG. 7A. The waveguide width, W, employed is 1.5 μm as an example.

The effective index of the core region 312 in the 2D modal may be determined by the width of the tapered semiconductor waveguide 304, and given by $$W(z) = W_0 + (W_e - W_0)\left(\frac{z}{L_t}\right)^\alpha, \quad \text{(Equation 3)}$$

where W(z) is the width of the waveguide 304 at position z, $W_0$ is the width of the waveguide 304 at the starting or initial position, $W_e$ is the width of the waveguide 304 at the ending position, z is the distance to the starting position of the tapering region, $L_t$ is the total length of the tapering region, α is the parameter determining the tapering shape.

Different values of the parameter α correspond to different tapering structures. The III-V waveguide 304 and silicon waveguide 340 in the SOI layer 306 have respective tapering structures denoted as α_35 and α_Si. In various embodiments, the tapering structure is not a linear taper. The width of the tapering structure or region at the position z may be as defined in Equation 3, which shows that the parameter α determines the width of the tapering region at position z.

Figure 8A:
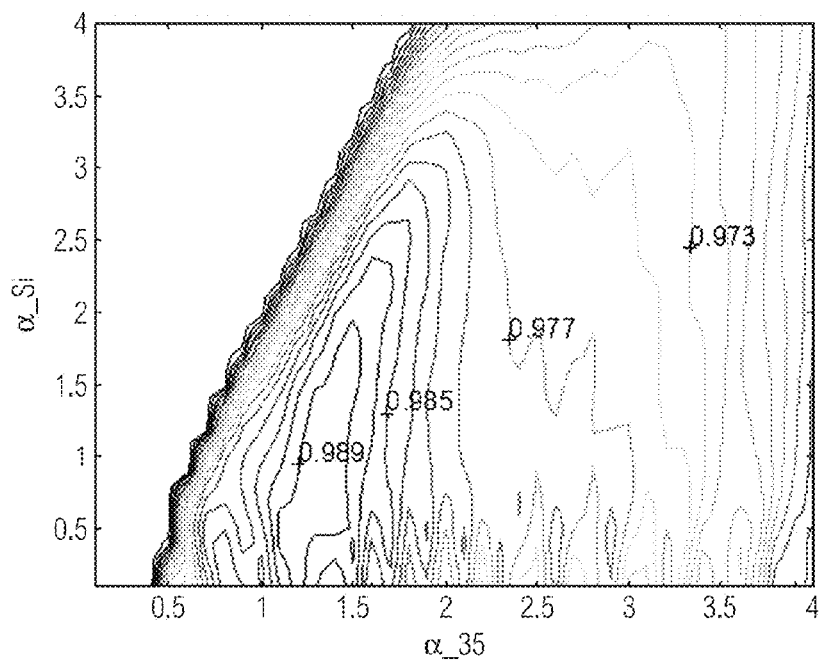
FIG. 8A shows a contour plot of coupling efficiency.

A wide-angle beam propagation method (WA-BPM) may be used to simulate the light propagating through the tapered region. The eigenmode of the silicon nanophotonic waveguide is used as the launching source (see FIG. 8B). The coupling efficiency may be estimated using the overlap integral between the eigenmode of the hybrid III-V/Si waveguide as shown in FIG. 8C and the field calculated with WA-BPM.

The length of the tapering region may be about 30 μm as an example. The coupling efficiency may be estimated for different taper shapes, i.e. with different values of α_Si and α_35, and the contour plot of coupling efficiency for different α_35 and α_Si values is illustrated in FIG. 8A, which shows that at α_Si=0.7 and α_35=1.4, the coupling efficiency reaches a maximal value of about 0.9905.

Figure 8B:
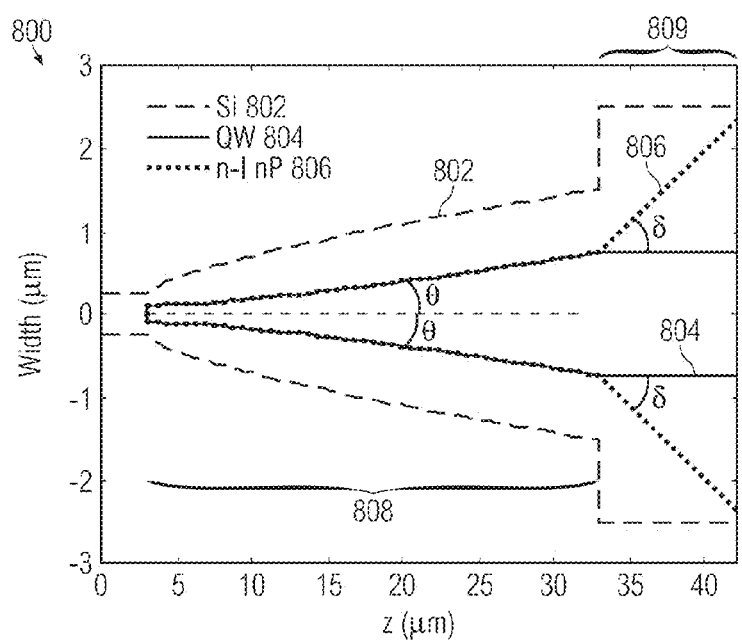
Figure 8C:
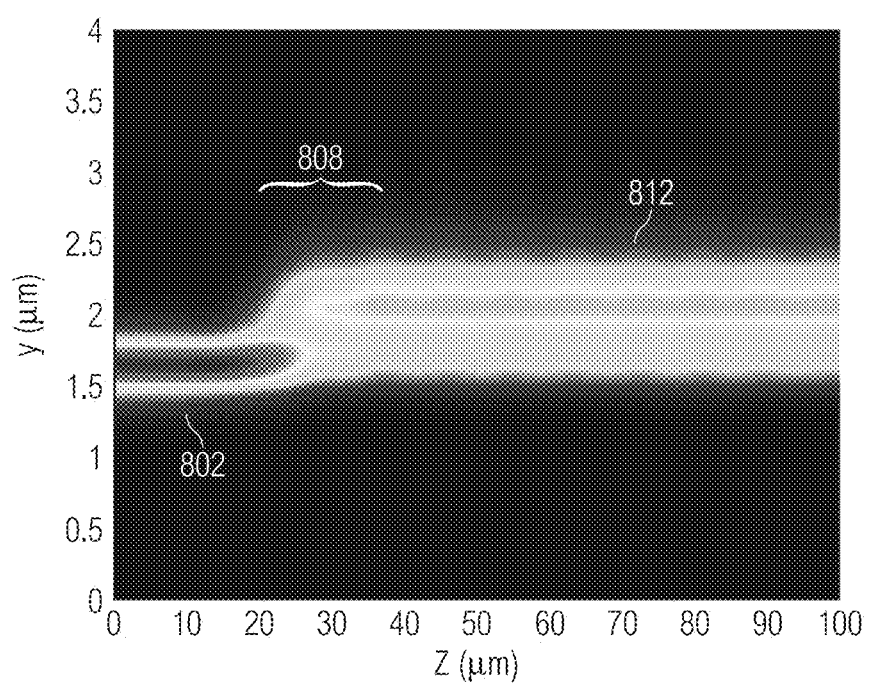
FIG. 8C shows the light propagation simulation using 2D-WA-BPM.

FIG. 8B shows a tapering waveguide structure 800 optimized with the two-dimensional approximate model using α_35=1.4 and α_Si=0.7, illustrating the taper shapes in the x-z plane for the silicon waveguide 802 and the III-V semiconductor waveguide having a core 804 and a bottom n-cladding 806, with no air-trench under the III-V waveguide. For clarity purposes, a top p-cladding over the core 804 is not illustrated in FIG. 8B.

As shown in FIG. 8B, each of the silicon waveguide 802, the core 804 and the n-cladding 806 has an overlapping tapering region, as represented by 808. In addition, the n-cladding 806 includes another tapering region 809, following the tapering region 808. The tapering region 808 of the core 804 and the n-cladding 806 has a tapering degree, θ, of about 1.4°, while the tapering region 809 has a tapering degree, δ, of about 11°.

FIG. 8C shows the light propagation simulation using 2D-WA-BPM, illustrating the light propagation (optical vertical interconnection access) from a silicon nanophotonic waveguide 802, through a tapering region 808 to the III-V semiconductor waveguide 812 (having the core 804 and the n-cladding 806). This shows that light is coupled from the silicon waveguide 802 to the III-V semiconductor waveguide 812 and confined in the III-V semiconductor waveguide 812, while propagating.

FIG. 9 shows a waveguide structure with a top-confined integration, according to various embodiments. FIG. 9A shows a cross-sectional view of the waveguide structure 900, FIG. 9B shows a side view of the waveguide structure 900, FIG. 9C shows the top view of the waveguide structure 900, and FIG. 9D shows the top view of the waveguide structure 960.

The waveguide structure 900 includes a silicon-on-insulator (SOI) substrate 902 and a semiconductor (e.g. II-VI direct-band semiconductor, III-V direct-band semiconductor, IV-VI direct-band semiconductor, ternary semiconductor or quaternary semiconductor) waveguide 904. The waveguide structure 900 may be an integrated structure, and the semiconductor waveguide 904 may be bonded to the SOI substrate 902, for example through direct wafer bonding.

The SOI substrate 902 includes a silicon-on-insulator (SOI) layer or core layer 906 with a bottom cladding of silicon dioxide 908. The SOI layer 906 is etched to form a waveguide (SOI waveguide) 940 in an at least substantially central position of the waveguide structure 900, beneath the semiconductor waveguide 904. The waveguide 940 may have a uniform width along its longitudinal direction. In other words, the waveguide 940 does not include any tapering portion.

Figure 9A:
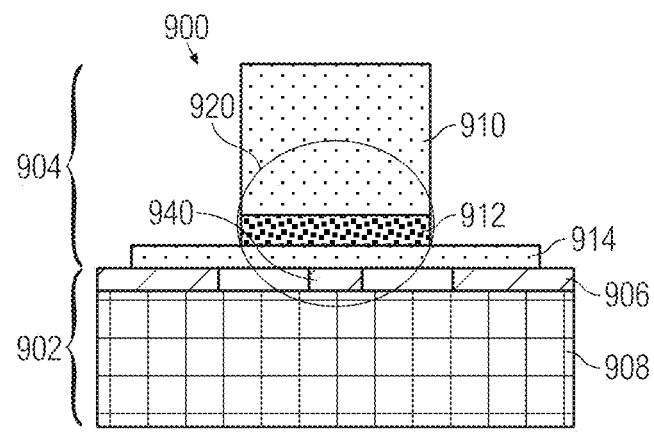
FIG. 9A shows a cross-sectional view of the waveguide structure.

The semiconductor waveguide 904 is integrated on top of or on or over the SOI layer 906 and correspondingly also the SOI substrate 902. The semiconductor waveguide 904 includes a p-cladding (e.g. a first cladding having a first conductivity type material) 910, a core 912 and an n-cladding (e.g. a second cladding having a second conductivity type material) 914. As illustrated in FIG. 9A, the semiconductor waveguide 904 is etched such that the p-cladding 910 and the core 912 may be disposed on a substantially central position of the waveguide structure 900, and have a respective width that is less than the width of the n-cladding 914. The p-cladding 910 and the core 912 may have at least substantially same width. The n-cladding 914 may have a width that is less than the width of the silicon core layer 906. In various embodiments, lateral light confinement (for example as schematically shown in FIG. 9A in the shaded circle 920) is achieved based on the etched semiconductor waveguide 904. As an example and not limitation, the semiconductor waveguide 904 may be a III-V direct-band semiconductor, for example indium phosphide (InP). The p-cladding 910 may be indium phosphide (InP) doped with zinc (Zn), the n-cladding 914 may be indium phosphide (InP) doped with silicon (Si), while the core 912 may be aluminium gallium indium arsenide (AlGaInAs) or indium gallium arsenide phosphide (InGaAsP).

Through appropriate design or implementation of the width of the semiconductor waveguide 904, light may be confined in the semiconductor waveguide 904, thereby improving the efficiency of the waveguide structure or device 900 in terms of light amplification. In various embodiments, the semiconductor waveguide 904 may have a width of between about 0.5 µm and about 5 µm (5000 nm), e.g. between about 0.5 µm and about 3 µm, between about 0.5 µm and about 1 µm, between about 1 µm and about 3 µm, between about 2 µm and about 4 µm or between about 2 µm and about 3 µm.

Figure 9B:
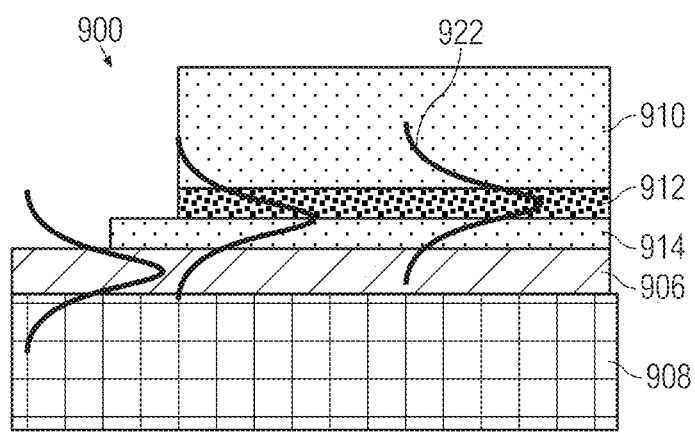
FIG. 9B shows a side view of the waveguide structure.

FIG. 9B illustrates the confinement of light, as represented by 922, in the SOI layer 906 and the propagation of the light 922 through the SOI layer 906. As the light 922 propagates through the SOI layer 906, the light 922 may be transferred or coupled from the SOI layer 906 to the semiconductor waveguide 904, via top-down coupling, through a tapering transition.

Figure 9C:
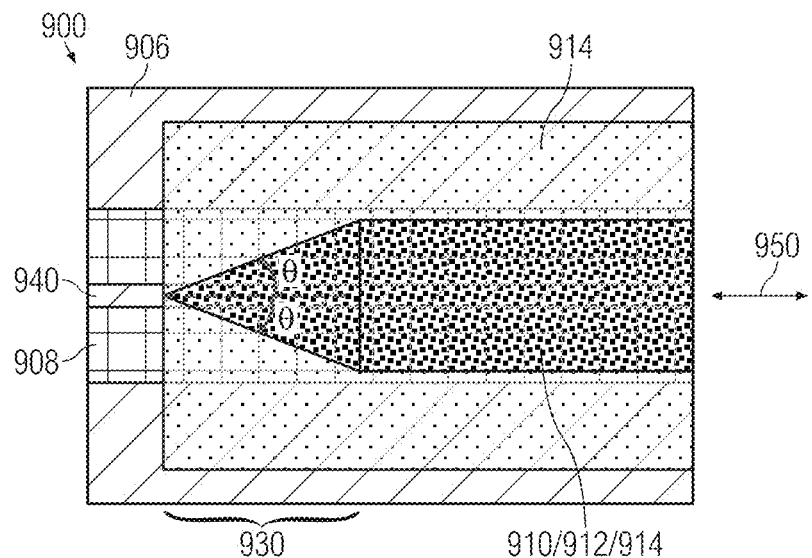
FIGS. 9C and 9D show the top view of the waveguide structure.

FIG. 9C shows a top view of the waveguide structure 900, including a tapering region 930 for top-down coupling between the SOI layer 906 and the semiconductor waveguide 904. Each of the p-cladding 910 and the core 912 may be formed with the tapering region 930. In other words, each of the p-cladding 910 and the core 912 may have a portion with a tapering region 930, followed by a portion of uniform width. The respective tapering regions of each of the p-cladding 910 and the core 912 at least substantially overlap with each other (e.g. overlapping in a range of between about 30% and about 100%, e.g. a range of about 50% and about 100% or range of about 75% and about 100%). In various embodiments, the tapering region 930 may have a tapering degree, θ, in a range of between about 0.5° and about 70° relative to the longitudinal direction/axis, as illustrated by the double-headed arrow 950, of the semiconductor waveguide 904, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

The SOI layer 906 may include a waveguide 940 configured to at least substantially overlap with the semiconductor waveguide 904. While not clearly shown in FIG. 9C, the waveguide 940 have a uniform width, with no tapering, along the longitudinal direction 950, of the waveguide 940 and the semiconductor waveguide 904. The waveguide 940 may partially overlap or completely overlap with the semiconductor waveguide 904, for example overlapping in a range of between about 30% and about 100%, e.g. a range of about 50% and about 100% or range of about 75% and about 100%.

Figure 9D:
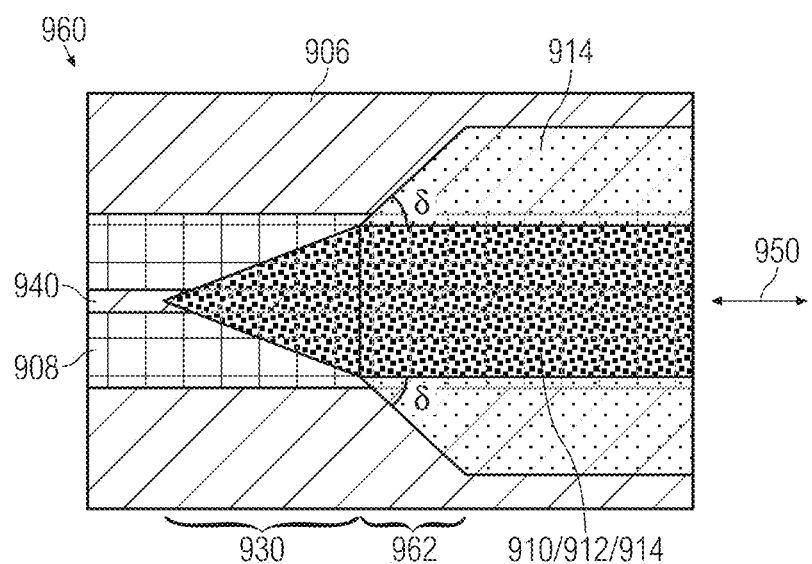

FIG. 9D shows a top view of the waveguide structure 960. The waveguide structure 960 is similar to the waveguide structure 900, except that the n-cladding 914 is etched so as to be tapered, for minimizing reflection loss that may occur at the end of the tapering region 930. The n-cladding 914 includes a first tapering region that at least substantially overlaps (e.g. overlapping in a range of between about 30% and about 100%, e.g. a range of about 50% and about 100% or range of about 75% and about 100%) with the tapering region 930 and the respective tapering regions of each of the p-cladding 910 and the core 912, and a second tapering region 962 following the first tapering region. As illustrated in FIG. 9D, the second tapering region 962 has a width that is wider than a width of the first tapering region. The n-cladding 914 may have a uniform width after the second tapering region 962.

The first tapering region and the second tapering region 962 taper in a direction at least substantially same as the respective tapering regions of each of the p-cladding 910 and the core 912 along a longitudinal direction/axis, as illustrated by the double-headed arrow 950, of the waveguide 940 and the semiconductor waveguide 904. In various embodiments, the first tapering region may have a tapering degree in a range of between about 0.5° and about 70° relative to the longitudinal axis 950 of the semiconductor waveguide 904, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°. The second tapering region 962 may have a tapering degree, δ, in a range of between about 0.5° and about 80° relative to the longitudinal axis 950 of the semiconductor waveguide 904, e.g. a range of between about 0.5° and about 50°, a range of between about 0.5° and about 30°, a range of between about 0.5° and about 10°, a range of between about 5° and about 80°, a range of between about 5° and about 30°, a range of between about 20° and about 80° or a range of between about 40° and about 80°.

The SOI layer 906 is thinner compared to the layer 106 of the structure 100 of FIGS. 1A and 1B. The SOI layer 906 may have a thickness of between about 200 nm and about 400 nm, e.g. between about 200 nm and about 300 nm or between about 300 nm and about 400 nm, e.g. a thickness of about 200 nm, about 250 nm, about 300 nm, about 350 nm or about 400 nm.

The waveguide structures 900, 960 confine the light laterally based on the etched direct band-gap semiconductor waveguide 904 on top of the SOI layer 906. In various embodiments, the light confinement in an active region of the core 912 may be maximized or enhanced for amplification/absorption through adjusting the width of the semiconductor waveguide 904 on the SOI layer 906.

Figure 10:
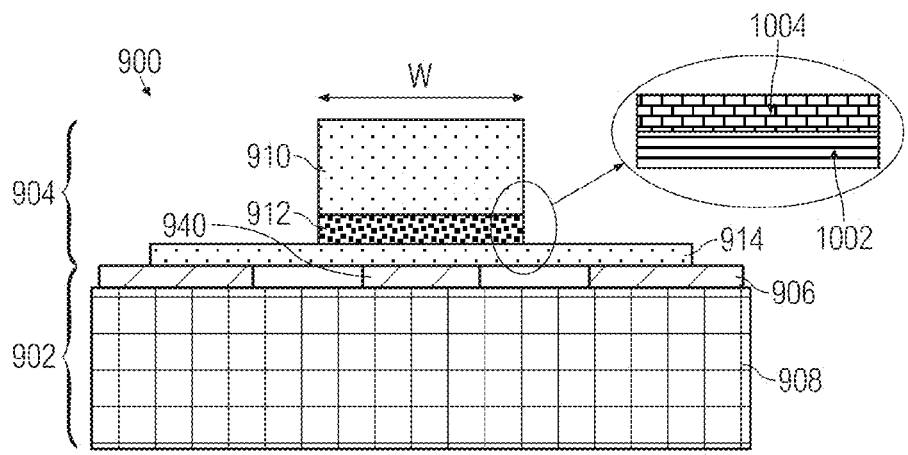
FIG. 10 shows a cross-sectional view of the waveguide structure of the embodiments of FIG. 9.

FIG. 10 shows a cross-sectional view of the waveguide structure 900 of the embodiments of FIG. 9. Each of the p-cladding 910 and the core 912 may have a respective width, W. The core 912 includes an active region 1002 and a separate confinement heterostructure (SCH) layer 1004 arranged over the active region 1002. The active region 1002 may have a thickness of about 150 nm and the separate confinement heterostructure (SCH) layer 1004 may have a thickness of about 200 nm. However, it should be appreciated that the active region 1002 and the SCH layer 1004 may have other thicknesses. In further embodiments, the core 912 may include an active region and two separate confinement heterostructure layers sandwiching the active region (i.e. the active region is arranged in between the two separate confinement heterostructure layers).

The SOI layer 906 may have a thickness of about 300 nm with a 1 μm buried oxide layer 908 underneath. The SOI waveguide 940 may have a width of about 500 nm. However, it should be appreciated that the SOI layer 906 and the oxide layer 908 may have other thicknesses, and that the SOI waveguide 940 may have other widths. The direct band-gap semiconductor may be an indium phosphide (InP) (III-V semiconductor) wafer, suitable for the photonic integrated circuits working at a wavelength of 1550 nm telecommunication window. In other words, the semiconductor waveguide 904 may be an indium phosphide (InP) semiconductor waveguide.

The refractive indices for the SOI layer 906, the active region 1002, the SCH layer 1004 and the InP cladding layers 910, 914 are about 3.477, 3.524, 3.461 and 3.167, respectively. The thickness of the bottom InP cladding layer 914 is about 150 nm.

A full-vectorial modal analysis may be carried out, which takes account of the influence of the width, W, of the semiconductor waveguide 904 on the light confinement.

Figure 11:
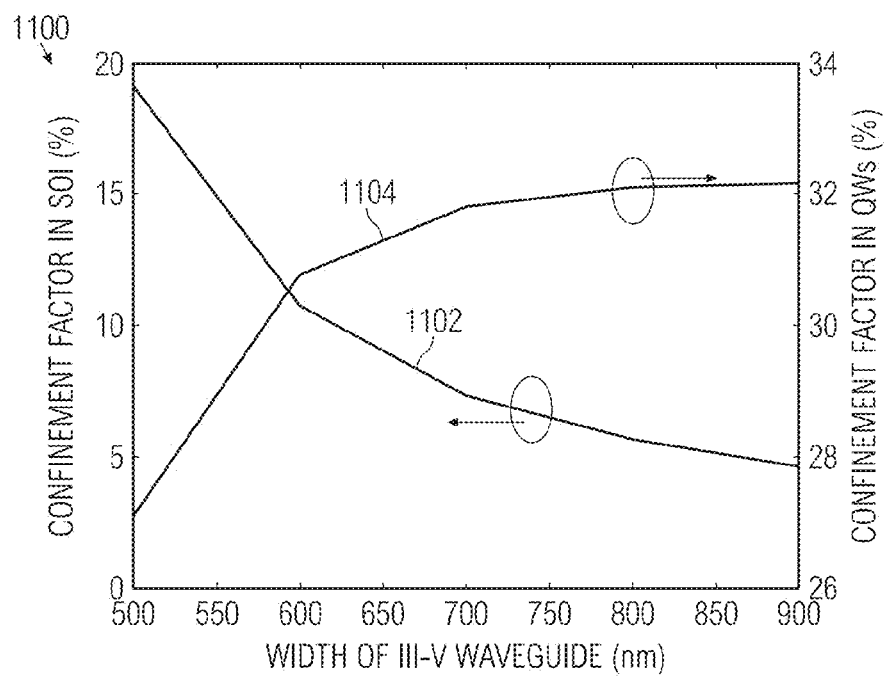
FIG. 11 shows a plot of confinement factors in the active region and the SOI layer for different waveguide widths of the waveguide structure of the embodiment of FIG. 10.

FIG. 11 shows a plot 1100 of confinement factors in the active region 1002 and the SOI layer 906 for different waveguide widths, W. The confinement factors may be determined using Equations 1 and 2.

The plot 1100 shows that the confinement factor 1102 in the SOI layer 906 decreases with the waveguide width, while the confinement factor 1104 in the active region 1002 increases with the waveguide width and reaches the maximal when the width, W, of the semiconductor waveguide is about 0.8 μm or more. FIGS. 12A to 12D show the modal profiles for different waveguide widths, W, of the waveguide structure 900 of the embodiment of FIG. 10. The width of the SOI waveguide 940 is about 0.5 μm.

Figure 12A:
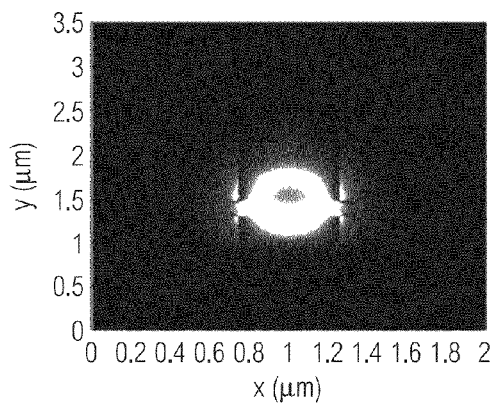
FIGS. 12A to 12D show the modal profiles for different waveguide widths of the waveguide structure of the embodiment of FIG. 10.
Figure 12B:
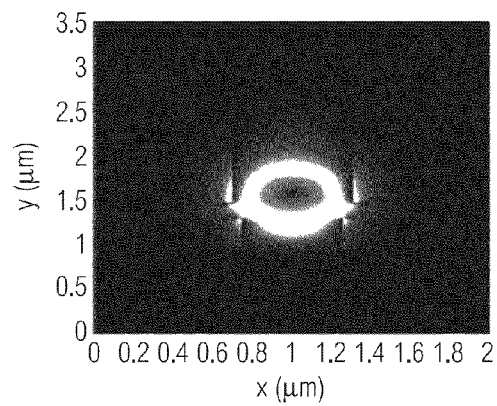
Figure 12C:
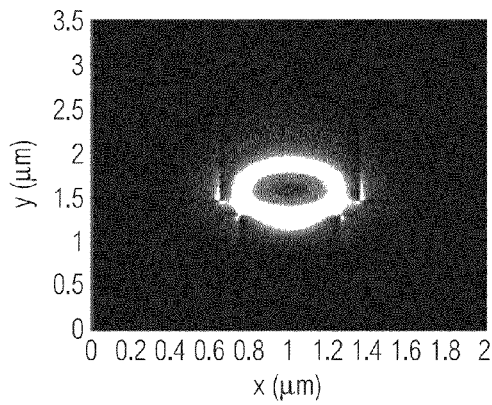
Figure 12D:
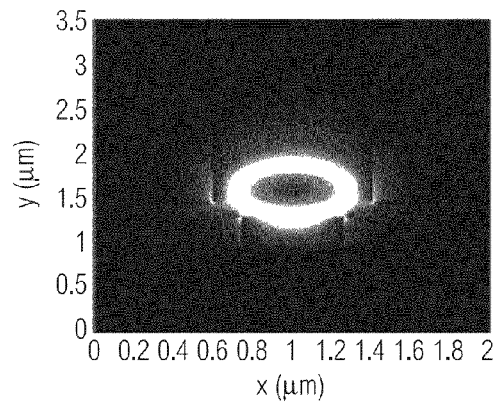

FIG. 12A shows the modal profile for a waveguide width, W=0.5 μm, FIG. 12B shows the modal profile for a waveguide width, W=0.6 μm, FIG. 12C shows the modal profile for a waveguide width, W=0.7 μm, and FIG. 12D shows the modal profile for a waveguide width, W=0.8 μm. As can be seen from FIGS. 12A to 12D, the light mode moves or transfers from the SOI layer to the semiconductor waveguide as the waveguide width, W, increases.

The taper optimization may be carried out using a similar design procedure as that described in the context of the waveguide structure 300 of the embodiment of FIG. 7A, and based on Equation 3. The length of the tapering region may be about 30 μm as an example, and the width of the silicon waveguide is about 0.5 μm as an example. The waveguide width, W, employed is 0.8 μm as an example.

Figure 13A:
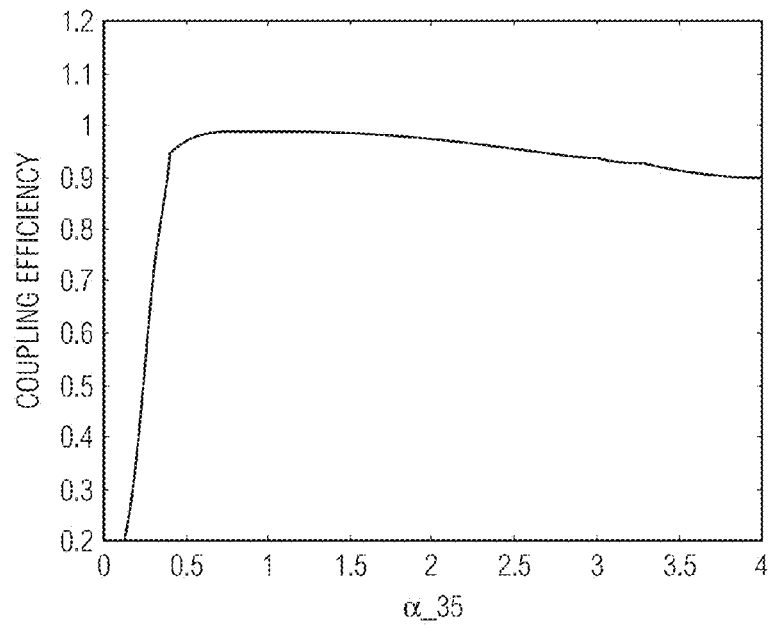
FIG. 13A shows a plot of coupling efficiency for different $\alpha\_35$ values.

The coupling efficiency may be estimated for different taper shapes, i.e. with different values of $\alpha\_35$ for the III-V waveguide 904. FIG. 13A shows a plot of coupling efficiency for different $\alpha\_35$ values, illustrating the relationship between the coupling efficiency and $\alpha\_35$. FIG. 13A shows that the coupling efficiency reaches a maximal value of about 0.9888 when $\alpha\_35=1.0$. In various embodiments, the tapering structure is not a linear taper. The width of the tapering structure or region at the position z may be as defined in Equation 3, which shows that the parameter a determines the width of the tapering region at position z.

Figure 13B:
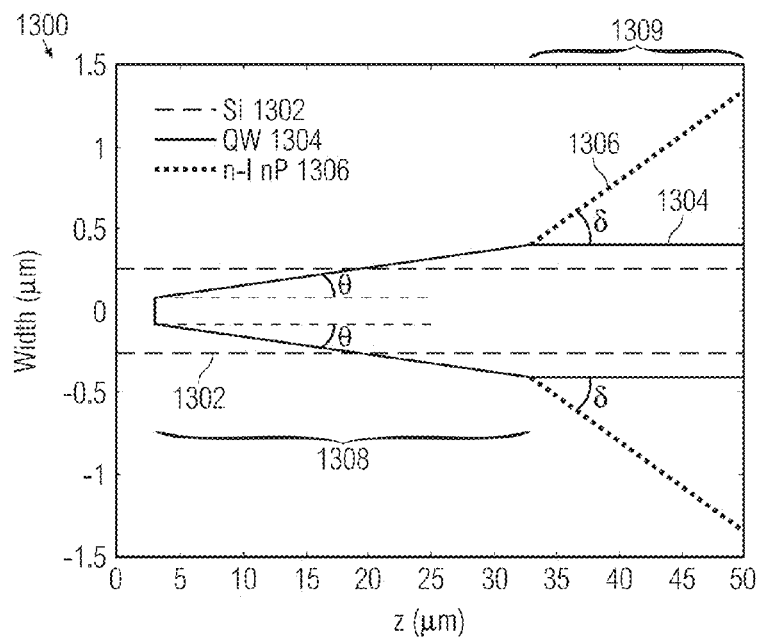

FIG. 13B shows a tapering waveguide structure 1300 optimized with the two-dimensional approximate model using $\alpha\_35=1.0$ (no tapering in the SOI waveguide, i.e. no $\alpha\_Si$), illustrating the taper shapes in the x-z plane for the silicon waveguide 1302 and the III-V waveguide having a core 1304 and a bottom n-cladding 1306. For clarity purposes, a top p-cladding over the core 1304 is not illustrated in FIG. 13B.

As shown in FIG. 13B, each of the silicon waveguide 1302, the core 1304 and the n-cladding 1306 has an overlapping tapering region, as represented by 1308. In addition, the n-cladding 1306 includes another tapering region 1309, following the tapering region 1308. The tapering region 1308 of the core 1304 and the n-cladding 1306 has a tapering degree, θ, of about 0.7°, while the tapering region 1309 has a tapering degree, δ, of about 6°.

Figure 13C:
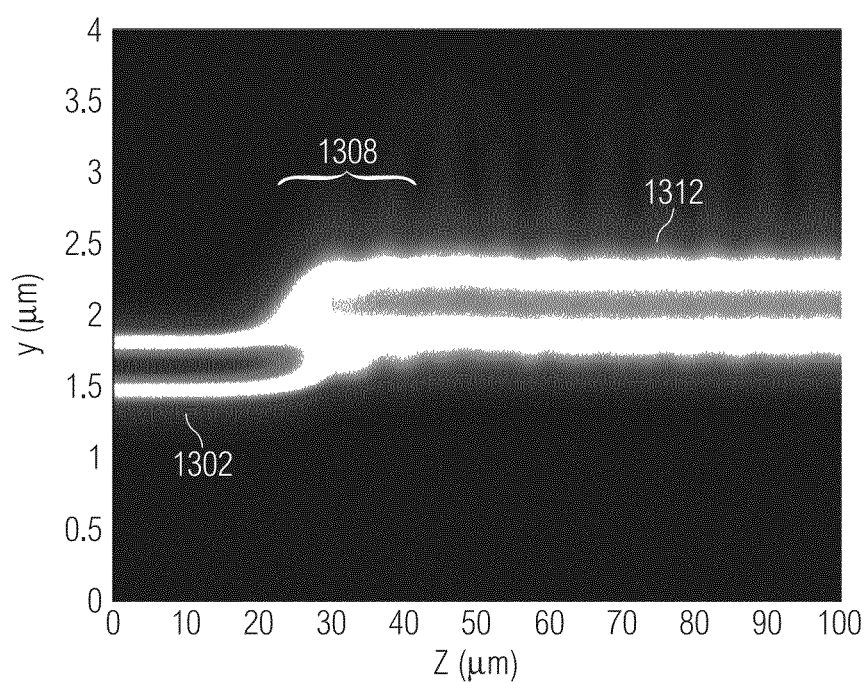
FIG. 13C shows the light propagation simulation using 2D-WA-BPM.

FIG. 13C shows the light propagation simulation using 2D-WA-BPM, illustrating the light propagation (optical vertical interconnection access) from a silicon nanophotonic waveguide 1302, through a tapering region 1308 to the III-V semiconductor waveguide 1312 (having the core 1304 and the n-cladding 1306). This shows that light is coupled from the silicon waveguide 1302 to the III-V semiconductor waveguide 1312 and confined in the III-V semiconductor waveguide 1312, while propagating.

FIG. 14 shows a waveguide structure with a bottom-confined integration, according to various embodiments. FIG. 14A shows a cross-sectional view of the waveguide structure 1400, FIG. 14B shows a side view of the waveguide structure 1400, FIG. 14C shows the top view of the waveguide structure 1400, and FIG. 14D shows the top view of the waveguide structure 1460.

The waveguide structure 1400 includes a silicon-on-insulator (SOI) substrate 1402 and a semiconductor (e.g. II-VI direct-band semiconductor, III-V direct-band semiconductor, IV-VI direct-band semiconductor, ternary semiconductor or quaternary semiconductor) waveguide 1404. The waveguide structure 1400 may be an integrated structure, and the semiconductor waveguide 1404 may be bonded to the SOI substrate 1402, for example through direct wafer bonding.

The SOI substrate 1402 includes a silicon-on-insulator (SOI) layer or core layer 1406 with a bottom cladding of silicon dioxide 1408. The SOI layer 1406 is etched to form a waveguide (SOI waveguide) 1440 in an at least substantially central position of the waveguide structure 1400, beneath the semiconductor waveguide 1404, for lateral light confinement. The waveguide 1440 includes a tapering portion.

Figure 14A:
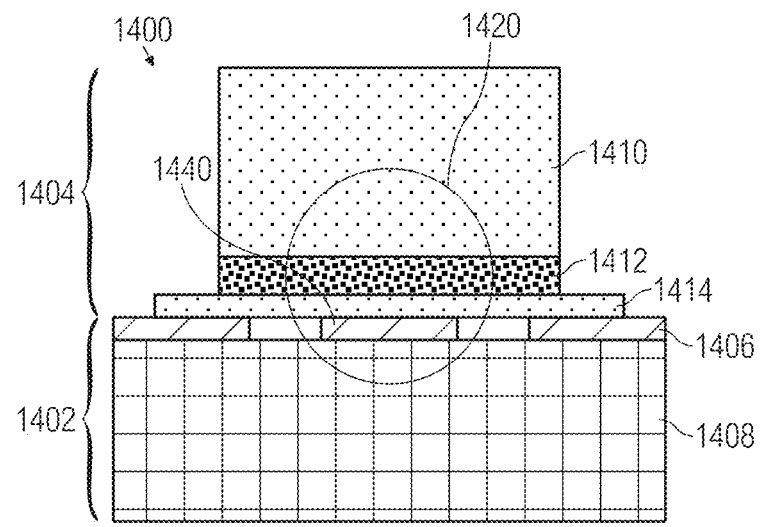
FIG. 14A shows a cross-sectional view of the waveguide structure.

The semiconductor waveguide 1404 is integrated on top of or on or over the SOI layer 1406 and correspondingly also the SOI substrate 1402. The semiconductor waveguide 1404 includes a p-cladding (e.g. a first cladding having a first conductivity type material) 1410, a core 1412 and an n-cladding (e.g. a second cladding having a second conductivity type material) 1414. The semiconductor waveguide 1404 is not etched to decrease its width. The p-cladding 1410 and the core 1412 may have at least substantially same width. The n-cladding 1414 may have a width that is less than the width of the silicon core layer 1406. In various embodiments, lateral light confinement (for example as schematically shown in FIG. 14A in the shaded circle 1420) is achieved based on the etched waveguide 1440. As an example and not limitation, the semiconductor waveguide 1404 may be a III-V direct-band semiconductor, for example indium phosphide (InP). The p-cladding 1410 may be indium phosphide (InP) doped with zinc (Zn), the n-cladding 1414 may be indium phosphide (InP) doped with silicon (Si), while the core 1412 may be aluminium gallium indium arsenide (AlGaInAs) or indium gallium arsenide phosphide (InGaAsP).

Through appropriate design or implementation of the dimensions (e.g. width) of the waveguide 1440, light may be confined in the semiconductor waveguide 1404, thereby improving the efficiency of the waveguide structure or device 1400 in terms of light amplification. The waveguide 1404 may have a width of between about 1 μm and about 5 μm, e.g. between about 1 μm and about 3 μm, between about 1 μm and about 2 μm, between about 2 μm and about 5 μm or between about 2 μm and about 3 μm.

Figure 14B:
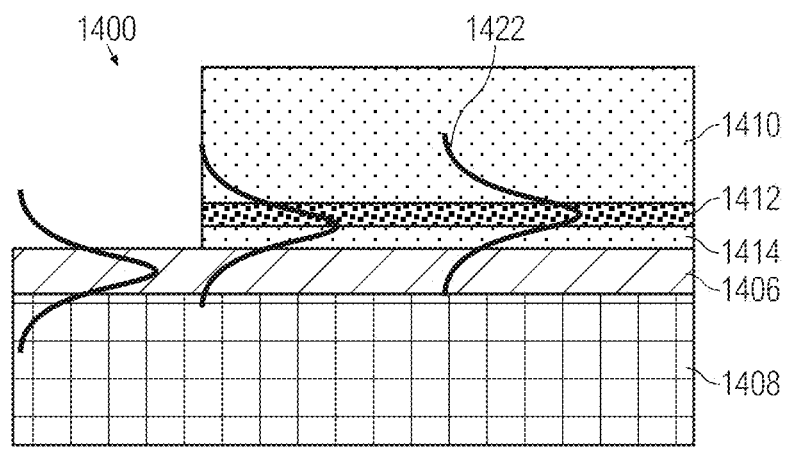
FIG. 14B shows a side view of the waveguide structure.

FIG. 14B illustrates the confinement of light, as represented by 1422, in the SOI layer 1406 and the propagation of the light 1422 through the SOI layer 1406. As the light 1422 propagates through the SOI layer 1406, the light 1422 may be transferred or coupled from the SOI layer 1406 to the semiconductor waveguide 1404, via top-down coupling, through a tapering transition.

Figure 14C:
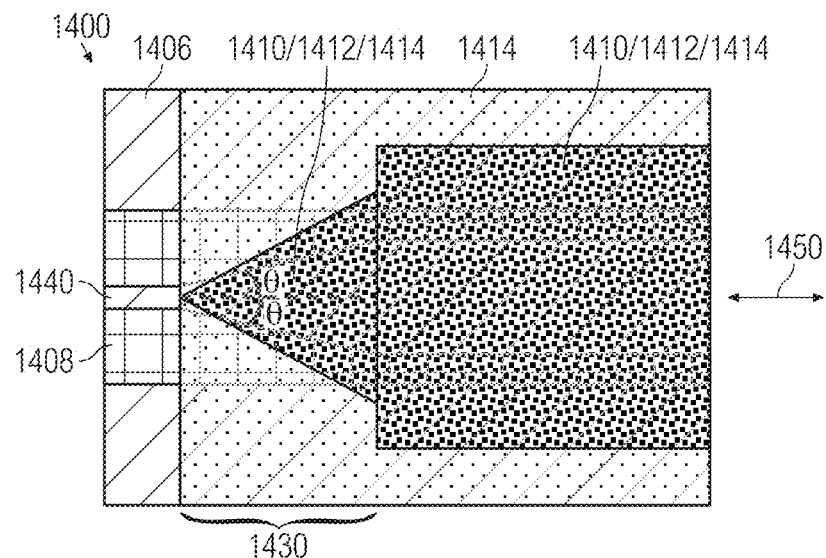
FIGS. 14C and 14D show the top view of the waveguide structure.

FIG. 14C shows a top view of the waveguide structure 1400, including a tapering region 1430 for top-down coupling between the SOI layer 1406 and the semiconductor waveguide 1404. Each of the p-cladding 1410 and the core 1412 may be formed with the tapering region 1430. In other words, each of the p-cladding 1410 and the core 1412 may have a portion with a tapering region 1430, followed by a portion of uniform width. The respective tapering regions of each of the p-cladding 1410 and the core 1412 at least substantially overlap with each other (e.g. overlapping in a range of between about 30% and about 100%, e.g. a range of about 50% and about 100% or range of about 75% and about 100%). In various embodiments, the tapering region 1430 may have a tapering degree, θ, in a range of between about 0.5° and about 70° relative to the longitudinal direction/axis, as illustrated by the arrow 1450, of the semiconductor waveguide 1404, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

The SOI layer 1406 includes a waveguide 1440 configured to at least substantially overlap with the semiconductor waveguide 1404. While not clearly shown in FIG. 14C, the waveguide 1440 is formed with a tapering portion that at least substantially overlaps with the tapering region 1430. The tapering portion tapers in a direction at least substantially same as the tapering region 1430 along the longitudinal direction/axis 1450, of the waveguide 1440 and the semiconductor waveguide 1404. The waveguide 1440 may have a uniform width, after the tapering region 1430. The waveguide 1440 may partially overlap or completely overlap with the semiconductor waveguide 1404, for example overlapping in a range of between about 30% and about 100%, e.g. a range of about 50% and about 100% or range of about 75% and about 100%. The tapering portion may partially overlap or completely overlap with the tapering region 1430, for example overlapping in a range of between about 30% and about 100%, e.g. a range of about 50% and about 100% or range of about 75% and about 100%. In various embodiments, the tapering portion may have a tapering degree in a range of between about 0.5° and about 70° relative to the longitudinal axis 1450 of the semiconductor waveguide 1404, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°.

Figure 14D:
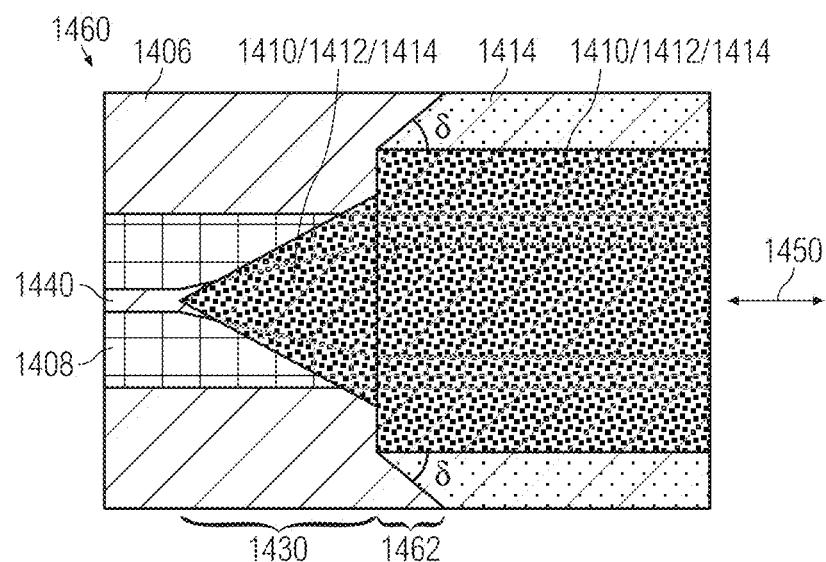

FIG. 14D shows a top view of the waveguide structure 1460. The waveguide structure 1460 is similar to the waveguide structure 1400, except that the n-cladding 1414 is etched so as to be tapered, for minimizing reflection loss that may occur at the end of the tapering region 1430. The n-cladding 1414 includes a first tapering region that at least substantially overlaps (e.g. overlapping in a range of between about 30% and about 100%, e.g. a range of about 50% and about 100% or range of about 75% and about 100%) with the tapering region 1430 and the respective tapering regions of each of the p-cladding 1410 and the core 1412, and a second tapering region 1462 following the first tapering region. As illustrated in FIG. 14D, the second tapering region 1462 has a width that is wider than a width of the first tapering region. The n-cladding 1414 may have a uniform width after the second tapering region 1462.

The first tapering region and the second tapering region 1462 taper in a direction at least substantially same as the respective tapering regions of each of the p-cladding 1410 and the core 1412 along a longitudinal direction/axis, as illustrated by the double-headed arrow 1450, of the waveguide 1440 and the semiconductor waveguide 1404. In various embodiments, the first tapering region may have a tapering degree in a range of between about 0.5° and about 70° relative to the longitudinal axis 1450 of the semiconductor waveguide 1404, e.g. a range of between about 0.5° and about 50°, a range of between about 0.5° and about 30°, a range of between about 0.5° and about 10°, a range of between about 5° and about 70°, a range of between about 5° and about 30°, a range of between about 20° and about 70° or a range of between about 40° and about 70°. The second tapering region 1462 may have a tapering degree, δ, in a range of between about 0.5° and about 80° relative to the longitudinal axis 1450 of the semiconductor waveguide 1404, e.g. a range of between about 0.5° and about 50°, a range of between about 0.5° and about 30°, a range of between about 0.5° and about 10°, a range of between about 5° and about 80°, a range of between about 5° and about 30°, a range of between about 20° and about 80° or a range of between about 40° and about 80°.

The SOI layer 1406 is thinner compared to the layer 106 of the structure 100 of FIGS. 1A and 1B. The SOI layer 1406 may have a thickness of between about 200 nm and about 400 nm, e.g. between about 200 nm and about 300 nm or between about 300 nm and about 400 nm, e.g. a thickness of about 200 nm, about 250 nm, about 300 nm, about 350 nm or about 400 nm.

The waveguide structures 1400, 1460 confine the light laterally based on the etched SOI waveguide 1440. In various embodiments, the light confinement in an active region of the core 1412 may be maximized or enhanced for amplification/absorption through adjusting the width of the SOI waveguide 1440.

Figure 15:
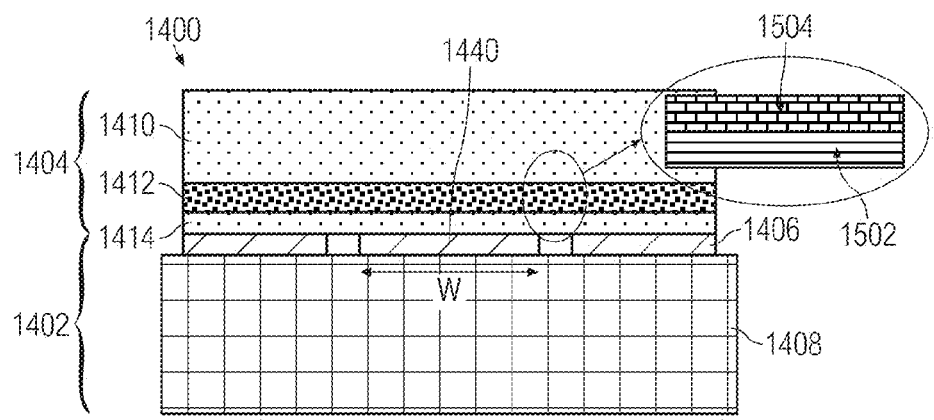
FIG. 15 shows a cross-sectional view of the waveguide structure of the embodiments of FIG. 14.

FIG. 15 shows a cross-sectional view of the waveguide structure 1400 of the embodiments of FIG. 14. The SOI waveguide 1440 has a width, W. The core 1412 includes an active region 1502 and a separate confinement heterostructure (SCH) layer 1504 arranged over the active region 1502. The active region 1502 may have a thickness of about 150 nm and the separate confinement heterostructure (SCH) layer 1504 may have a thickness of about 200 nm. However, it should be appreciated that the active region 1502 and the SCH layer 1504 may have other thicknesses. In further embodiments, the core 1412 may include an active region and two separate confinement heterostructure layers sandwiching the active region (i.e. the active region is arranged in between the two separate confinement heterostructure layers).

The SOI layer 1406 may have a thickness of about 300 nm with a 1 μm buried oxide layer 1408 underneath. However, it should be appreciated that the SOI layer 1406 and the oxide layer 1408 may have other thicknesses. The direct band-gap semiconductor may be an indium phosphide (InP) (III-V semiconductor) wafer, suitable for the photonic integrated circuits working at a wavelength of 1550 nm telecommunication window. In other words, the semiconductor waveguide 1404 may be an indium phosphide (InP) semiconductor waveguide.

The refractive indices for the SOI layer 1406, the active region 1502, the SCH layer 1504 and the InP cladding layers 1410, 1414 are about 3.477, 3.524, 3.461 and 3.167, respectively. The thickness of the bottom InP cladding layer 1414 is about 150 nm.

A full-vectorial modal analysis may be carried out, and the specifications of the waveguide structure 1400 under different widths, W, of the SOI waveguide 1440 are shown in Table 1.

TABLE 1

| W (μm) | T_QW | T_Si | We* |
|---|---|---|---|
| 0.8 | 0.3134 | 0.0423 | 1.64 |
| 1.0 | 0.3110 | 0.0657 | 1.24 |
| 1.2 | 0.3081 | 0.086 | 1.12 |
| 1.4 | 0.3055 | 0.1019 | 1.1 |
| 1.6 | 0.3033 | 0.1136 | 1.12 | where T_QW and T_Si refer to the light energy confinement factors confined by the active region 1502 and the SOI waveguide 1440 respectively.

Figure 16:
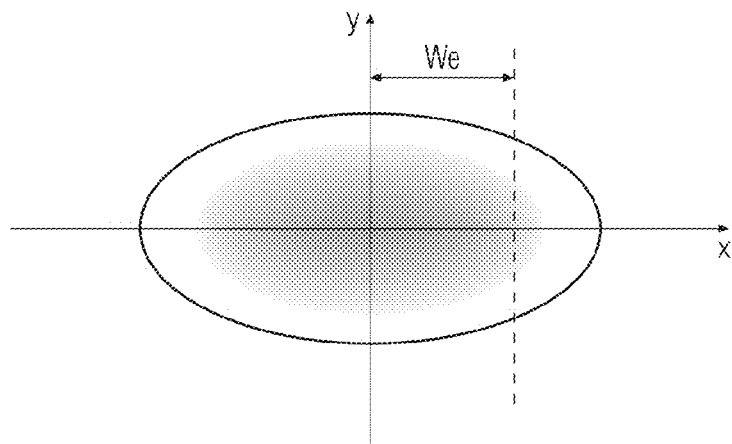
FIG. 16 shows a schematic illustrating the parameter We for characterizing the mode size in the x direction.

The parameter We is used to define the mode-size in the x-direction to characterize the lateral light confinement, as shown in FIG. 16, where $E(W_e) = e^{-1} E(0)$, and where $E(x)$ refers to the electric field at position x.

Figure 17A:
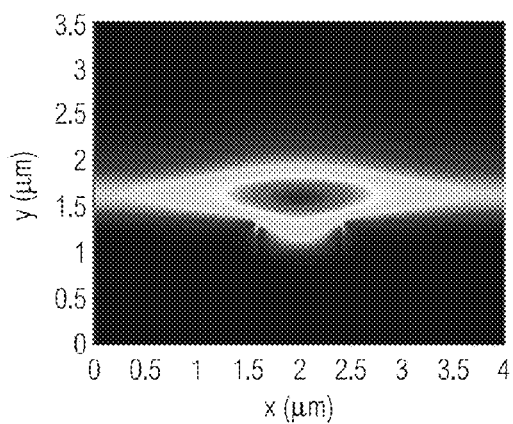
FIGS. 17A and 17B show the modal profiles for different waveguide widths of the waveguide structure of the embodiment of FIG. 15.
Figure 17B:
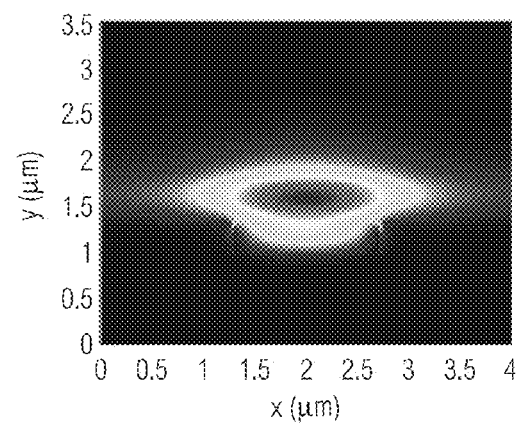

FIGS. 17A and 17B show the modal profiles for different waveguide widths, W, of the waveguide structure 1400 of the embodiment of FIG. 15. The SOI waveguide 1440 may have a width of tens of micrometers, for example between about 10 μm and about 80 μm, e.g. between about 10 μm and about 50 μm, between about 10 μm and about 30 μm, between about 30 μm and about 80 μm, between about 50 μm and about 80 μm or between about 30 μm and about 50 μm. FIG. 17A shows the modal profile for a waveguide width, W=0.8 μm, and FIG. 17B shows the modal profile for a waveguide width, W=1.4 μm.

The taper optimization may be carried out using a similar design procedure as that described in the context of the waveguide structure 300 of the embodiment of FIG. 7A, and based on Equation 3. The length of the tapering region may be about 60 μm as an example. The SOI waveguide width, W, employed is 1.4 μm as an example, which has the smallest mode size in terms of the lateral light confinement.

Figure 18A:
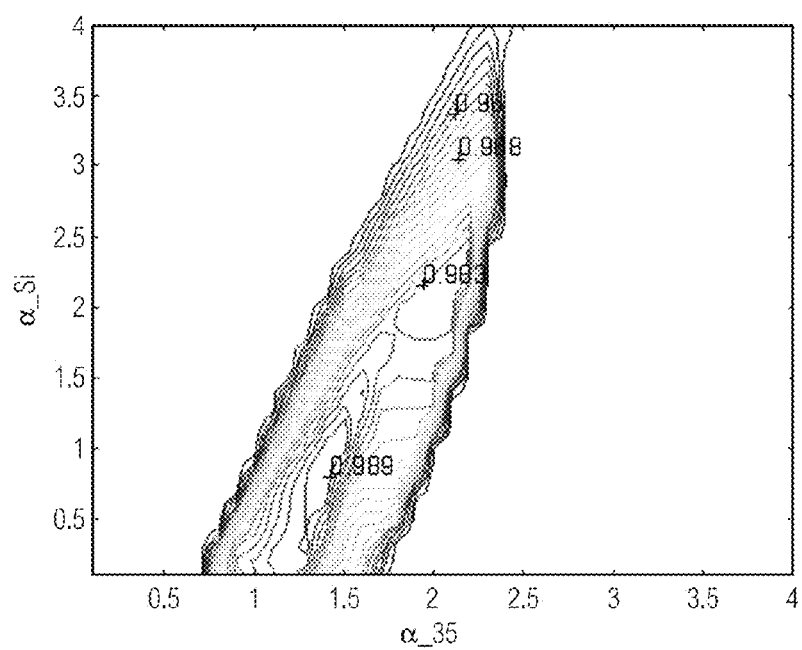
FIG. 18A shows a contour plot of coupling efficiency.

The coupling efficiency may be estimated for different taper shapes, i.e. with different values of α_Si and α_35 for the III-V waveguide 1404 and SOI waveguide 1440, and the contour plot of coupling efficiency for different α_35 and α_Si values is illustrated in FIG. 18A, which shows that at α_Si=0.8 and α_35=1.4, the coupling efficiency reaches a maximal value of about 0.9905. In various embodiments, the tapering structure is not a linear taper. The width of the tapering structure or region at the position z may be as defined in Equation 3, which shows that the parameter a determines the width of the tapering region at position z.

Figure 18B:
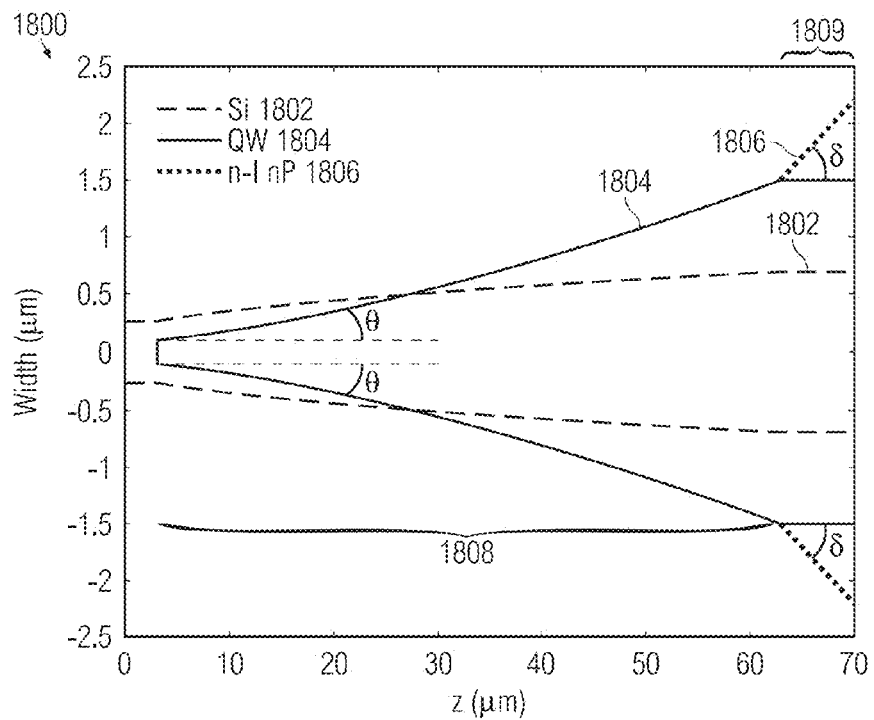

FIG. 18B shows a tapering waveguide structure 1800 optimized with the two-dimensional approximate model using α_35=1.4 and α_Si=0.8, illustrating the taper shapes in the x-z plane for the silicon waveguide 1802 and the III-V waveguide having a core 1804 and a bottom n-cladding 1806. For clarity purposes, a top p-cladding over the core 1804 is not illustrated in FIG. 18B.

As shown in FIG. 18B, each of the silicon waveguide 1802, the core 1804 and the n-cladding 1806 has an overlapping tapering region, as represented by 1808. In addition, the n-cladding 1806 includes another tapering region 1809, following the tapering region 1808. The tapering region 1808 of the core 1804 and the n-cladding 1806 has a tapering degree, θ, of about 1.4°, while the tapering region 1809 has a tapering degree, δ, of about 6°.

Figure 18C:
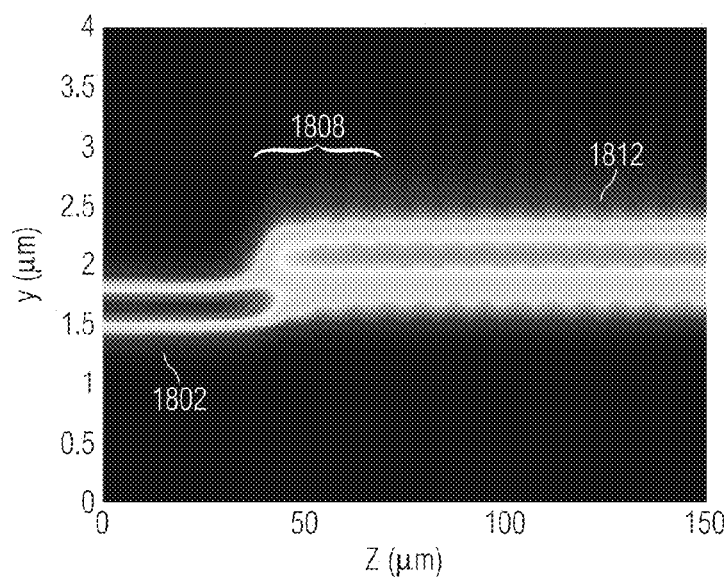
FIG. 18C shows the light propagation simulation using 2D-WA-BPM.

FIG. 18C shows the light propagation simulation using 2D-WA-BPM, illustrating the light propagation (optical vertical interconnection access) from a silicon nanophotonic waveguide 1802, through a tapering region 1808 to the III-V semiconductor waveguide 1812 (having the core 1804 and the n-cladding 1806). This shows that light is coupled from the silicon waveguide 1802 to the III-V semiconductor waveguide 1812 and confined in the III-V semiconductor waveguide 1812, while propagating.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A waveguide structure comprising:
   a silicon-on-insulator layer; and
   a semiconductor waveguide disposed on the silicon-on-insulator layer, wherein the semiconductor waveguide comprises a tapering region, and wherein the semiconductor waveguide further comprises:
   a first cladding comprising a first conductivity type material;
   a second cladding comprising a second conductivity type material; and
   a core disposed in between the first cladding and the second cladding; and wherein each of the core and the first cladding comprises the tapering region;

wherein the respective tapering regions of each of the core and the first cladding are configured to at least substantially overlap with each other, and wherein the second cladding is disposed between the core and the silicon-on-insulator layer, the second cladding comprising:
 a first tapering region configured to at least substantially overlap with the respective tapering regions of each of the core and the first cladding; and
 a second tapering region following the first tapering region,
 wherein the second tapering region has a width that is wider than a width of the first tapering region,
 wherein the first tapering region and the second tapering region are configured to taper in a direction at least substantially the same as the respective tapering regions of each of the core and the first cladding along a longitudinal direction of the semiconductor waveguide; and
 wherein a tapering angle of the second tapering region defined relative to the longitudinal direction of the semiconductor waveguide is larger than a tapering angle of the first tapering region defined relative to the longitudinal direction of the semiconductor waveguide, and wherein the silicon-on-insulator layer comprises a tapering portion configured to at least substantially overlap with the tapering region, and wherein the tapering portion is configured to taper in a direction at least substantially the same as the tapering region along a longitudinal direction of the semiconductor waveguide.

2. The waveguide structure as claimed in claim 1, wherein the first conductivity type is a p-type conductivity type, and wherein the second conductivity type is an n-type conductivity type.

3. The waveguide structure as claimed in claim 1, wherein the tapering angle of the first tapering region is between about 0.5° and about 70° relative to the longitudinal direction of the semiconductor waveguide.

4. The waveguide structure as claimed in claim 1, wherein the tapering angle of the second tapering region is between about 0.5° and about 80° relative to the longitudinal direction of the semiconductor waveguide.

5. The waveguide structure as claimed in claim 1, wherein the core comprises:
 an active region configured for waveguiding; and
 a separate confinement heterostructure layer arranged above or under the active region.

6. The waveguide structure as claimed in claim 1, wherein the core comprises:
 an active region configured for waveguiding; and
 two separate confinement heterostructure layers, wherein the active region is arranged in between the two separate confinement heterostructure layers.

7. The waveguide structure as claimed in claim 1, wherein the silicon-on-insulator layer comprises a waveguide configured to at least substantially overlap with the semiconductor waveguide, the waveguide comprising the tapering portion.

8. The waveguide structure as claimed in claim 1, wherein the tapering portion has a tapering angle of between about 0.5° and about 70° relative to the longitudinal direction of the semiconductor waveguide.

9. The waveguide structure as claimed in claim 1, wherein the semiconductor waveguide has a width of between about 0.5 μm and about 5 μm.

10. The waveguide structure as claimed in claim 1, wherein the silicon-on-insulator layer has a thickness of between about 200 nm and about 400 nm.

11. The waveguide structure as claimed in claim 1, wherein the semiconductor waveguide comprises a direct band-gap semiconductor.

12. The waveguide structure as claimed in claim 1, wherein the semiconductor waveguide comprises a III-V semiconductor or a II-VI semiconductor or a IV-VI semiconductor or a ternary semiconductor or a quaternary semiconductor.

13. The waveguide structure as claimed in claim 1, wherein the tapering region has a tapering angle of between about 0.5° and about 70° relative to a longitudinal direction of the semiconductor waveguide.

14. The waveguide structure as claimed in claim 1, wherein the silicon-on-insulator layer comprises a waveguide coupled to the tapering portion.

15. The waveguide structure as claimed in claim 1, wherein the tapering portion of the silicon-on-insulator layer has a width larger than the tapering region of the semiconductor waveguide.

16. The waveguide structure as claimed in claim 1, wherein the second tapering region of the second cladding and a region following the second tapering region are wider than the first cladding and the core arranged over the second cladding.

* * * * *